(12) United States Patent
Gaudreau

(10) Patent No.: US 6,239,843 B1
(45) Date of Patent: May 29, 2001

(54) METHOD AND SYSTEM FOR DECODING DATA IN A SIGNAL

(75) Inventor: Jean Etienne Gaudreau, Scottsdale, AZ (US)

(73) Assignee: WAVO Corporation, Phoenix, AZ (US)

( * ) Notice: Subject to any disclaimer, the term of this patent is extended or adjusted under 35 U.S.C. 154(b) by 0 days.

(21) Appl. No.: 08/841,794

(22) Filed: May 5, 1997

(51) Int. Cl.[7] ............... H04N 7/08; H04N 7/087
(52) U.S. Cl. ............ 348/465; 348/468; 348/473; 348/478; 348/461
(58) Field of Search ............... 348/465, 466, 348/467, 468, 478, 464, 473, 477, 479, 461; H04N 7/08, 7/087

(56) References Cited

U.S. PATENT DOCUMENTS

| | | |
|---|---|---|
| 4,380,027 | 4/1983 | Leventer . |
| 4,424,533 | 1/1984 | Rzeszewski . |
| 4,434,438 | 2/1984 | Rzeszewski . |
| 4,673,979 | 6/1987 | Kobo et al. . |
| 4,719,510 | 1/1988 | Kinghorn . |
| 4,725,886 | 2/1988 | Galumbeck et al. . |
| 4,794,626 | 12/1988 | Tanabe et al. . |
| 5,212,551 | 5/1993 | Conanan . |
| 5,237,290 * | 8/1993 | Banu et al. .................... 331/2 |
| 5,278,845 | 1/1994 | Reint Jes et al. . |
| 5,301,023 | 4/1994 | Zato . |
| 5,404,172 * | 4/1995 | Berman et al. ............... 348/465 |
| 5,483,292 | 1/1996 | Ko . |
| 5,504,751 * | 4/1996 | Ledzius et al. ............. 370/100.1 |
| 5,506,626 | 4/1996 | Yagi et al. . |
| 5,517,249 | 5/1996 | Rodriguez-Cavazos et al. . |
| 5,530,655 | 6/1996 | Lokhoff et al. . |
| 5,543,850 | 8/1996 | Pratt . |
| 5,543,852 * | 8/1996 | Yuen et al. .................. 348/478 |
| 5,555,025 | 9/1996 | McArthur . |
| 5,561,469 | 10/1996 | Schultz . |
| 5,589,886 | 12/1996 | Ezaki . |
| 5,596,372 * | 1/1997 | Berman et al. ............... 348/537 |
| 5,627,593 | 5/1997 | Eitz . |
| 5,654,763 | 8/1997 | Bruckner et al. . |
| 5,657,088 * | 8/1997 | Hankinson ................... 348/465 |
| 5,666,548 | 9/1997 | Grimm et al. . |
| 5,708,475 * | 1/1998 | Hayashi et al. .............. 348/468 |
| 5,715,011 | 2/1998 | Bramwell . |
| 5,812,619 * | 9/1998 | Runaldue .................... 375/376 |
| 5,835,153 * | 11/1998 | Pratt et al. .................. 348/468 |
| 5,838,382 * | 11/1998 | Cahill, III .................. 348/465 |
| 5,953,065 * | 9/1999 | Cahill, III .................. 348/478 |

* cited by examiner

*Primary Examiner*—Reinhard J. Eisenzopf
*Assistant Examiner*—Jean W. Désir
(74) *Attorney, Agent, or Firm*—Snell & Wilmer L.L.P.

(57) ABSTRACT

A decoding system comprises a software-oriented implementation of the decoding process for extracting binary teletext and closed caption data from a signal. The decoder system according to one embodiment includes a processing unit which implements both a closed caption module and a teletext module. The decoder system calls the closed caption module to detect a clock synchronization signal associated with closed caption data. Upon finding the clock synchronization signal, the closed caption module synchronizes to the signal, identifies a framing code, and extracts the closed caption data. Similarly, the decoder system may call the teletext module for the teletext lines, which also synchronizes using a teletext clock synchronization signal. When the clock synchronization signal is detected, the teletext module interpolates the incoming data to reconstruct the data signal. The data signal is then processed to normalize the amplitude and reduce the "ghost" effects of signal echoes prior to the slicing of the data signal. The data is also suitably subjected to Hamming code error detection to ensure the accuracy of the data.

133 Claims, 16 Drawing Sheets

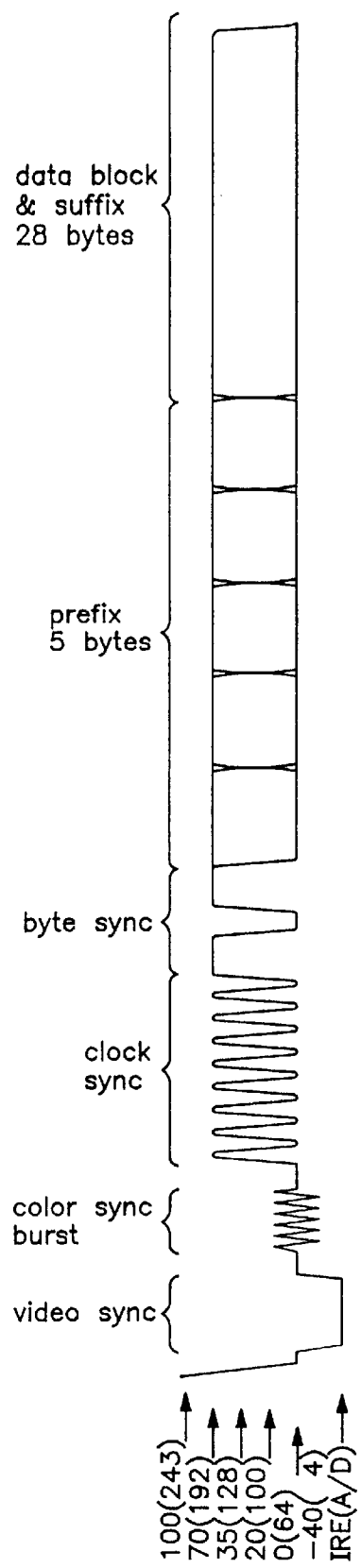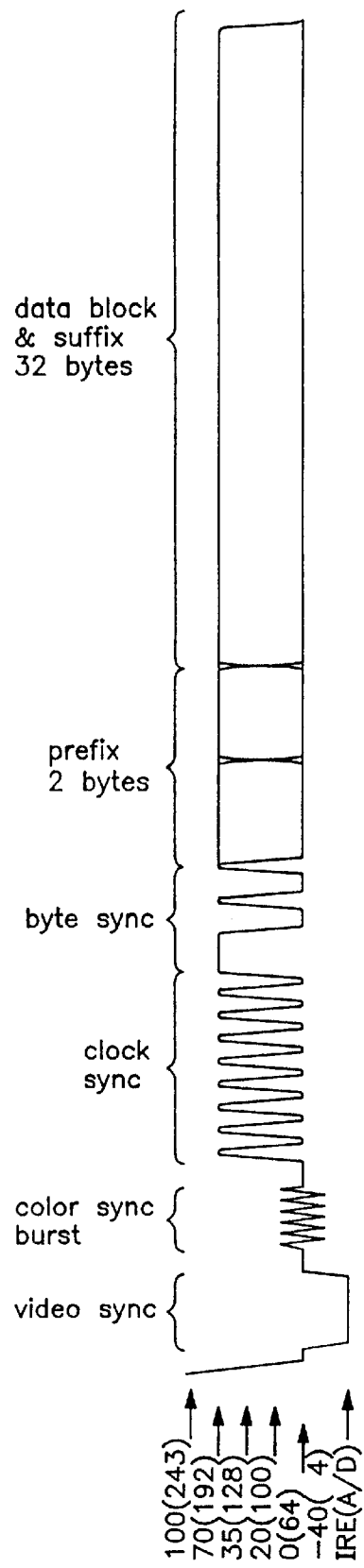

| Binary code | | | | | | | Hex | | |
|---|---|---|---|---|---|---|---|---|---|
| 1 | 1 | 1 | 0 | 0 | 1 | 1 | E7 | FC NABTS | |
| 0 | 1 | 1 | 0 | 0 | 1 | 1 | 67 | used | |
| 1 | 0 | 1 | 0 | 0 | 1 | 1 | A7 | Not used | 1010 look like run-in clock |
| 1 | 1 | 0 | 0 | 0 | 1 | 1 | C7 | used | |
| 1 | 1 | 1 | 1 | 0 | 1 | 1 | F7 | used | * |
| 1 | 1 | 1 | 0 | 1 | 1 | 1 | EF | used | * |
| 1 | 1 | 1 | 0 | 0 | 0 | 1 | E3 | used | |
| 1 | 1 | 1 | 0 | 0 | 1 | 0 | E5 | Not used | conflict with FC WST |
| 1 | 1 | 1 | 0 | 0 | 1 | 0 | E6 | Not used | conflict with FC WST |
| | | | | | | | | | |
| 1 | 0 | 0 | 0 | 0 | 1 | 0 | 84 | FC NABTS Alt 1 | |
| 0 | 0 | 0 | 0 | 0 | 1 | 0 | 04 | used | |
| 1 | 1 | 0 | 0 | 0 | 1 | 0 | C4 | Not used | conflict with FC WST |
| 1 | 0 | 1 | 0 | 0 | 1 | 0 | A4 | Not used | conflict with FC WST |
| 1 | 0 | 0 | 1 | 0 | 1 | 0 | 94 | used | |
| 1 | 0 | 0 | 0 | 1 | 0 | 0 | 8C | used | |
| 1 | 0 | 0 | 0 | 0 | 0 | 0 | 80 | used | |
| 1 | 0 | 0 | 0 | 1 | 1 | 0 | 86 | used | |
| 1 | 0 | 0 | 0 | 1 | 0 | 1 | 85 | used | |
| | | | | | | | | | |
| 0 | 1 | 0 | 0 | 1 | 1 | 0 | 4D | FC NABTS Alt 2 | |
| 1 | 1 | 0 | 0 | 1 | 1 | 0 | CD | used | |
| 0 | 0 | 0 | 0 | 1 | 1 | 0 | 0D | used | |
| 0 | 1 | 1 | 0 | 1 | 1 | 0 | 6D | used | |
| 0 | 1 | 0 | 1 | 1 | 1 | 0 | 5D | Not used | 0101 look like run-in clock |
| 0 | 1 | 0 | 0 | 1 | 0 | 1 | 45 | Not used | 0101 look like run-in clock |
| 0 | 1 | 0 | 0 | 1 | 0 | 1 | 49 | used | |
| 0 | 1 | 0 | 0 | 1 | 1 | 1 | 4F | used | |
| 0 | 1 | 0 | 0 | 1 | 0 | 0 | 4C | used | |
| | | | | | | | | | |
| 1 | 1 | 1 | 0 | 0 | 1 | 0 | E4 | FC WST | |
| 0 | 1 | 1 | 0 | 0 | 1 | 0 | 64 | used | |
| 1 | 0 | 1 | 0 | 0 | 1 | 0 | A4 | Not used | conflict with FC NABTS |
| 1 | 1 | 0 | 0 | 0 | 1 | 0 | C4 | Not used | conflict with FC NABTS |
| 1 | 1 | 1 | 1 | 0 | 1 | 0 | F4 | used | |
| 1 | 1 | 1 | 0 | 1 | 0 | 0 | EC | used | |
| 1 | 1 | 1 | 0 | 0 | 0 | 0 | E0 | used | |
| 1 | 1 | 1 | 0 | 0 | 1 | 0 | E6 | Not used | conflict with FC NABTS |
| 1 | 1 | 1 | 0 | 0 | 1 | 1 | E5 | Not used | conflict with FC NABTS |

FIG. 14

METHOD AND SYSTEM FOR DECODING DATA IN A SIGNAL

BACKGROUND OF THE INVENTION

1. Field of the Invention

The invention relates to decoding signals, and more particularly, to methods and apparatus for decoding teletext and/or closed caption data embedded within signals such as video signals.

2. Description of the Related Art

Although watching television has been the national pastime of the United States and other countries for many years, the computer revolution has begun to expand the usefulness of television beyond its traditional role. Technological developments in recent decades have led to the advent of closed caption television, which integrates a secondary signal into the main television signal. The closed caption data may be decoded and displayed separately on the display system, for example to provide subtitles to hearing-impaired viewers.

An even more recent development is the advent of teletext, which provides a method of broadcasting data by integrating it into the television signal. Like closed caption data, the teletext information is integrated into the television signal without disrupting the television image. As information technology like the Internet develops, teletext is likely to assume a greater role in information systems.

Decoder systems for extracting the teletext and closed caption information from the television signal have been developed and made publicly available. These decoder systems are typically hardware systems integrated into the television circuitry. As the television signal is received by the television, the decoder system continuously monitors the incoming signal for codes indicating that teletext or closed caption data follows. The decoder system then decodes the data "on the fly" and provides it to the user.

Although conventional decoder systems effectively decode and present the data, they suffer several drawbacks. On of the most obvious problems is the cost. The circuitry required to perform the processing in real time is typically dedicated solely to detecting and decoding the teletext and closed caption data. Designing and manufacturing such dedicated circuitry is typically costly. In addition, such systems suffer limited flexibility, as alterations to hardware designs are often costly and difficult to implement, especially after the decoder system has been installed. Further, such systems may be subject to interference that, while of limited effect on the television image, may significantly affect the detection and decoding of the data.

SUMMARY OF THE INVENTION

A teletext and closed caption data decoding system according to various aspects of the present invention provides a software-oriented implementation of the decoding process. The software-oriented implementation tends to reduce the cost of the implementation, as conventional circuitry may be used to perform the decoding and related functions. In addition, the software-oriented decoding system provides for improved efficiency with respect to processing resources, which improves its usefulness in a computer environment. Further, the software may be relatively easily redesigned, tested, and implemented.

In particular, a decoder system according to one embodiment includes a processing unit, such as a microprocessor or a microcontroller, which implements both a closed caption module and a teletext module. The decoder system accumulates digitized video data in a memory until several lines have accumulated. The processing unit then activates either the teletext module or the closed caption module according to which line of data is being analyzed. If the line corresponds to closed caption data, the processor calls the closed caption module, which attempts to detect a clock synchronization signal associated with the closed caption data. Upon finding the clock synchronization signal, the closed caption module synchronizes to the signal and extracts the closed caption data. Similarly, the decoder system may call the teletext module for the teletext lines, which also synchronizes using a teletext clock synchronization signal. When the clock synchronization signal is detected, the teletext module interpolates the incoming data to reconstruct the data signal. The data signal is then processed to reduce multipath or microreflection effects prior to the slicing of the data signal. The data is also suitably subjected to Hamming code error detection to ensure the accuracy of the data.

BRIEF DESCRIPTION OF THE DRAWING FIGURES

The subject matter of the invention is particularly pointed out and distinctly claimed in the concluding portion of the specification. The invention, however, both as to organization and method of operation, may best be understood by reference to the following description taken in conjunction with the claims and the accompanying drawing, in which like parts may be referred to by like numerals:

FIG. 1 is a block diagram of a general television system;

FIGS. 2A–B are diagrams of portions of an NABTS video signal and a WST video signal, respectively;

Figure 8:
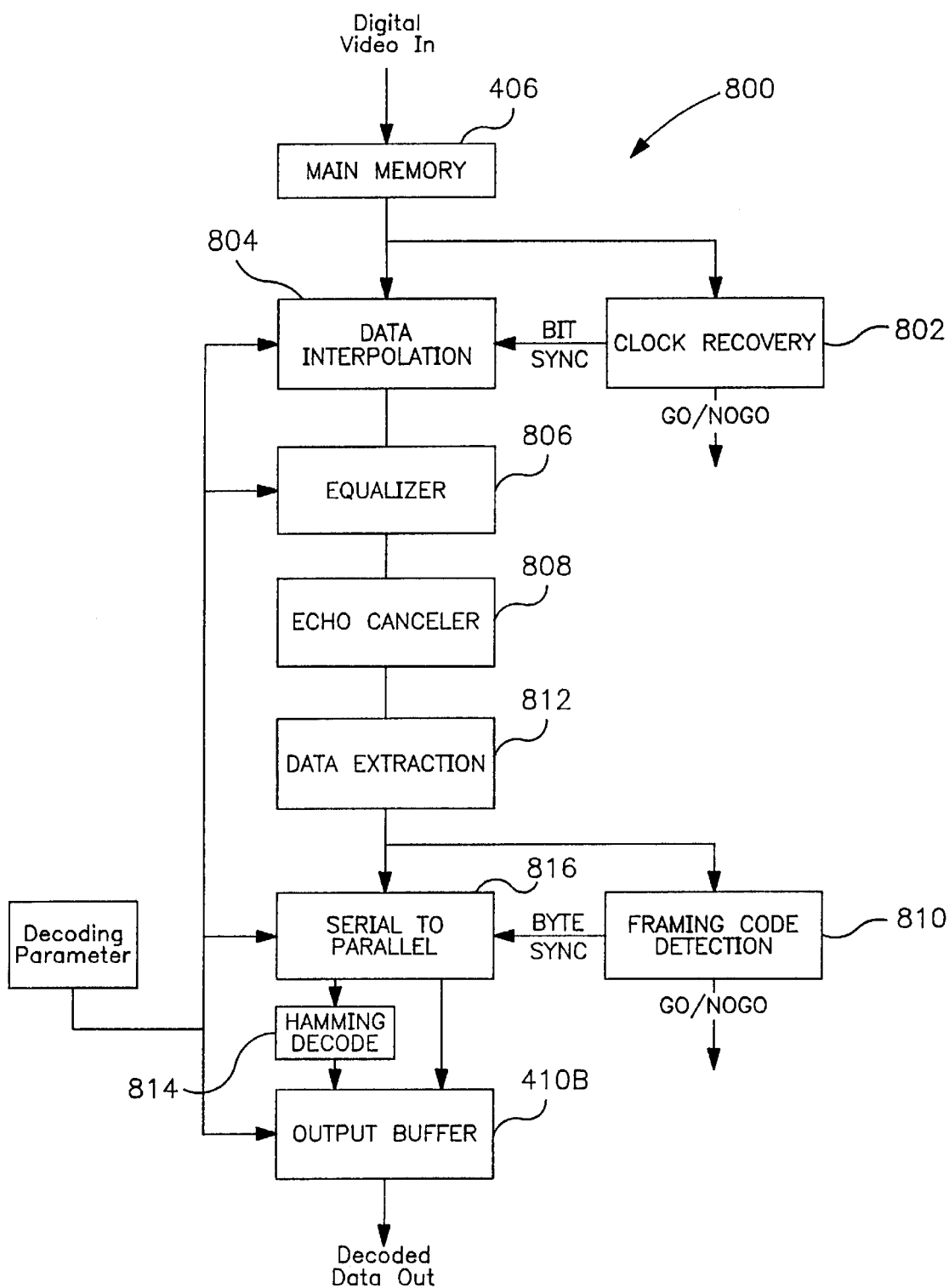
Figure 9:
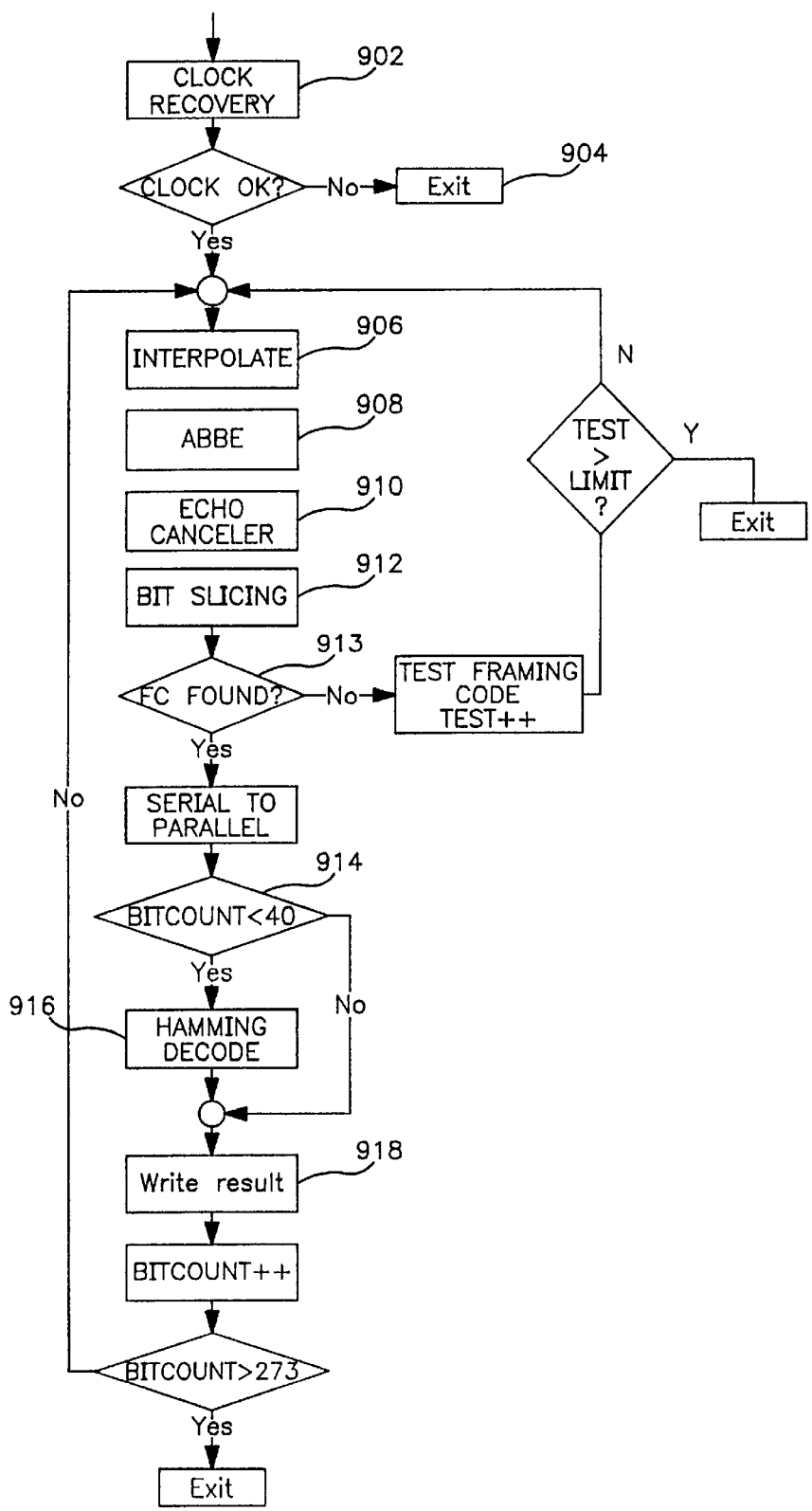
Figure 11:
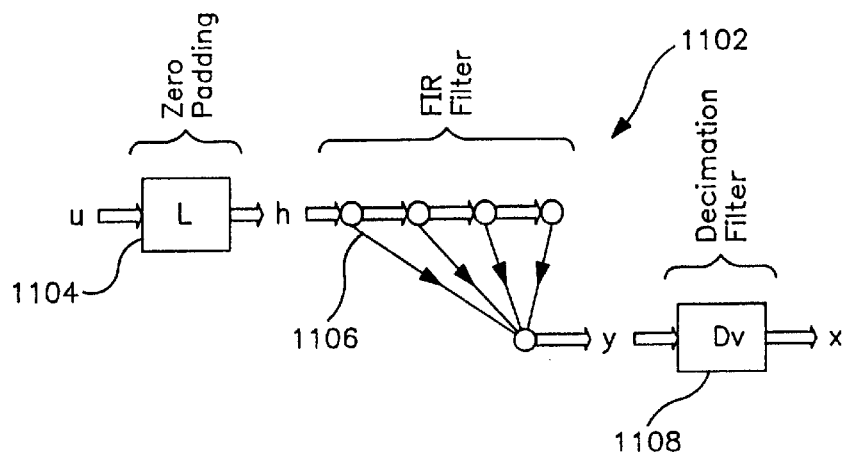
Figure 12B:
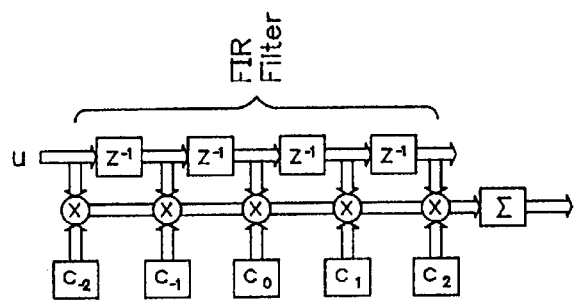
Figure 12C:
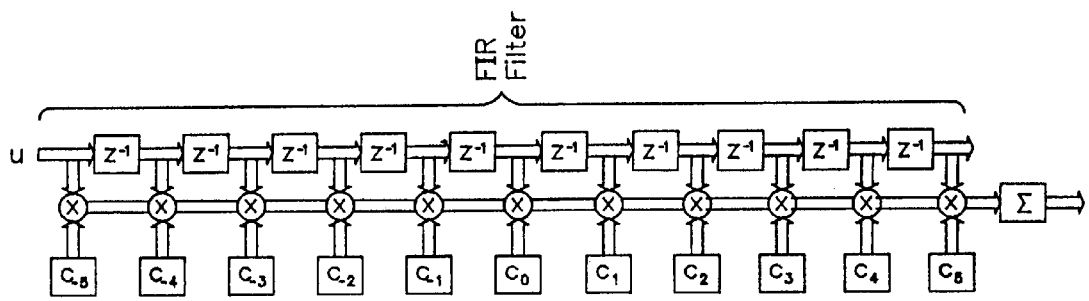
Figure 12A:
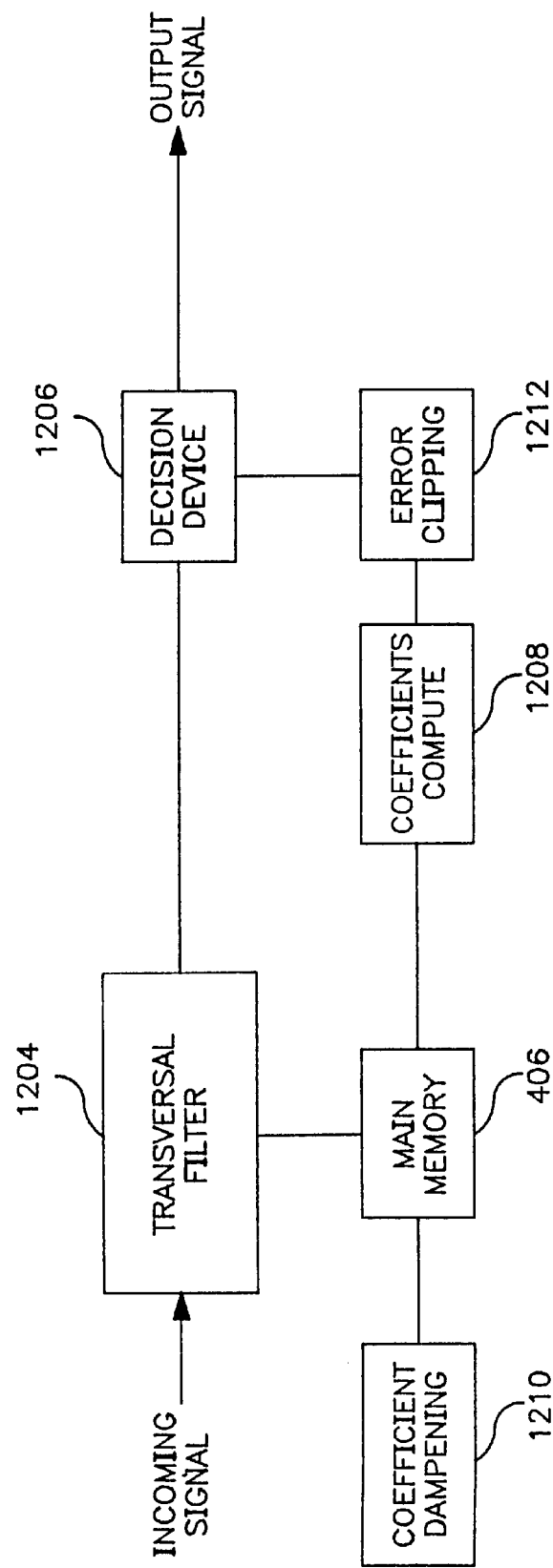
Figure 13:
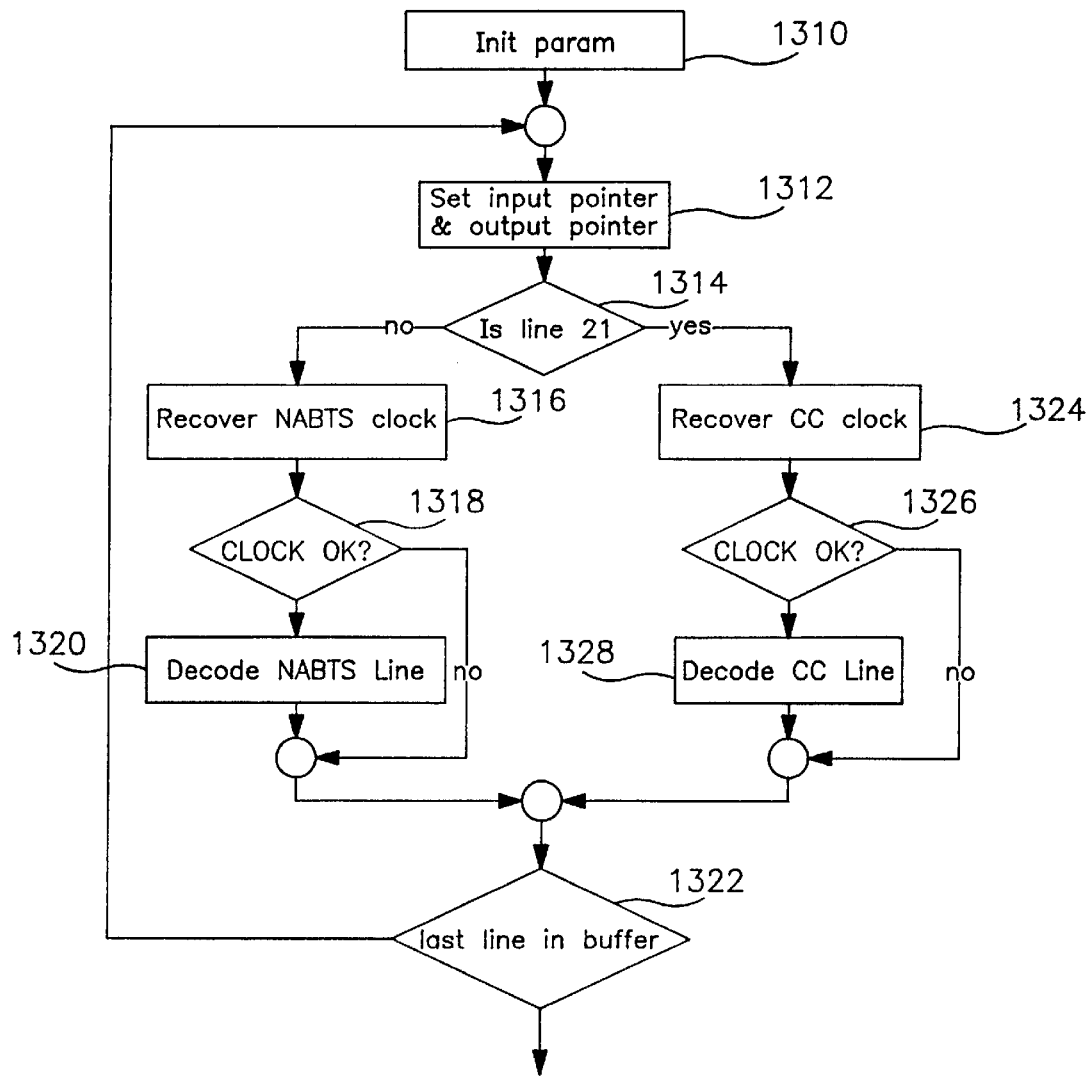

FIGS. 7A–E are flow diagrams of a process for recovering the clock synchronization signal in a closed caption signal;

FIG. 8 is a block diagram of a system for analyzing teletext data;

FIG. 9 is a flow diagram of a process for tracking and extracting teletext data from a digitized television signal;

FIGS. 10A–E are flow diagrams of a process for recovering the clock synchronization signal in a teletext signal;

FIG. 11 is a block diagram of a system for data interpolation;

FIGS. 12A–C are block diagrams of systems for equalization;

FIG. 13 is a flow diagram of a process for extracting closed caption and teletext data from a television signal; and FIG. 14 is a table listing of exemplary acceptable framing codes exhibiting a one-bit error.

DETAILED DESCRIPTION OF PREFERRED EXEMPLARY EMBODIMENTS

Figure 1:
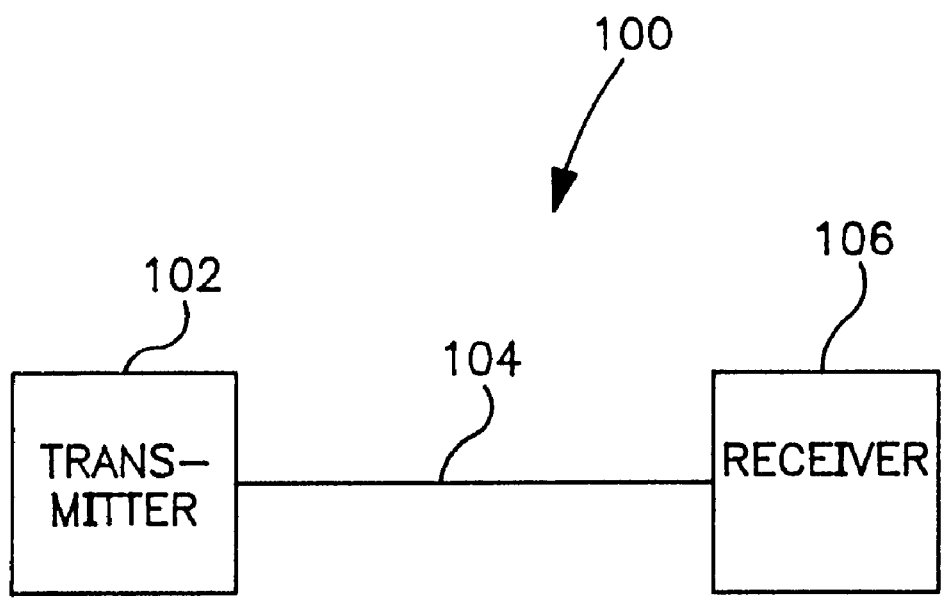

Referring now to FIG. 1, a generalized signal transmission and reception system 100 comprises a transmitter 102, a communications medium 104, and a receiver 106. The transmitter 102 suitably comprises any source of television or other video signals to be transmitted to the receiver via the communications medium 104. The communications medium 104 transmits the signals generated by the transmitter 102 to the receiver 106. The receiver 106 decodes the signals and provides the teletext and/or closed caption information, and suitably video information, to a user.

In a system according to various aspects of the present invention, the transmitter 102 suitably comprises any source of signals, such as video signals including a television signal or the like, including a television broadcast company, a cable service provider, a television camera, or a videocassette system. In the present embodiment, the transmitter 102 suitably generates a conventional video signal, for example according to NTSC standards. In addition, the signals generated by the transmitter 102 suitably include an integrated secondary signal, such as teletext and/or closed caption data in selected blanking intervals. In particular, the transmitter suitably generates signals having baseband teletext and/or closed caption information transmitted in a vertical blanking interval (VBI) of the video signal.

Teletext information is suitably included in the VBI according to a conventional specification, such as North American Broadcast Teletext System (NABTS) or Word System Teletext (WST). Similarly, the closed caption data may be integrated into the signal generated by the transmitter 102 in accordance with conventional standards for closed caption transmissions, for example EIA-608 standards. It should be noted, however, that various aspects of a decoding system according to the present invention are not so limited, and various aspects of the present decoding system and methods may be used in any analogous signal receiver for decoding data in a signal.

Referring now to FIGS. 2A and 2B, the teletext data is suitably integrated into the VBI portion of the video signal. In the present embodiment, the video signal is a standard NTSC video signal, and the teletext information is suitably provided within a selected portion of the video signal, for example between lines 10 and 20 of both the odd and even fields of the video signal. Alternatively, teletext information may be transmitted in any or all video lines in place of an actual video line, for example a full field teletext transmission. To facilitate tracking of the signal and retrieval of the teletext signal, the video signal in the VBI may include information, for example in the form of pulses or waveforms. The teletext portion of the signal suitably comprises: a video synchronization pulse; a color burst; a clock synchronization signal; a byte synchronization signal; a set of prefix values; and a data block. The video synchronization pulse is suitably provided in accordance with conventional television specifications to indicate the beginning of a line. Following the video synchronization pulse, a color burst in the chroma carrier is transmitted to lock the phase of the receiver's 106 chroma oscillator for demodulation of the transmitted color signals. It should be noted that the color burst may not be included in some types of signals, for example, black and white NTSC video signals.

After the horizontal synchronization signal and the color burst (if present), the transmitter 102 transmits the clock synchronization signal, suitably comprising a sine waveform, to facilitate synchronization of the receiver's 106 data reading components to the transmitted signal. The clock synchronization signal suitably serves to mark the optimal bit position for the remaining portion of the signal. The duration of the clock synchronization signal may vary according to the specifications for the signal. For NABTS and WST signals, however, the clock synchronization signal comprises eight cycles. By tracking the phase of the clock synchronization signal, the receiver 106 can synchronize to track the following data.

After the clock synchronization signal is transmitted to facilitate clock synchronization, the transmitter 102 transmits the byte synchronization signal. The byte synchronization signal suitably includes a framing code, for example an eight-bit code, to forecast the transmission of the prefix bytes and the data block. Thus, when this code is identified, the receiver 106 may determine when the prefix bytes and the data block are about to be received. Accordingly, the transmitter 102 transmits the prefix bytes and the data block after the framing code. The prefix bytes suitably include Hamming encoded bytes. For example, an NABTS signal includes a five-byte packet, and a WST signal includes a two-byte packet, though the prefix's size is variable depending on the values in the first two bytes. Packet structure information, packet address, and continuity index information are suitably included in the prefix bytes.

Finally, the transmitter 102 transmits the data block, which optionally includes an appropriate suffix. For an NABTS transmission, the data and optional suffix block comprise 28 bytes, while the corresponding block in a WST transmission is typically 29 bytes for an NTSC television system. The data block suitably contains the actual data associated with the transmission and is to be analyzed by the receiver 106.

The closed caption signal structure is suitably similar to that of the teletext signal. In the present embodiment and in conjunction with conventional closed caption signals, however, the signal frequency is lower and the data block includes only two bytes with no prefix bytes. Unlike the teletext signal, the closed caption information is conventionally integrated into line 21 of one or both (odd and even) fields. The closed caption information may, however, be integrated into any VBI lines, or even any video line.

Figure 3:
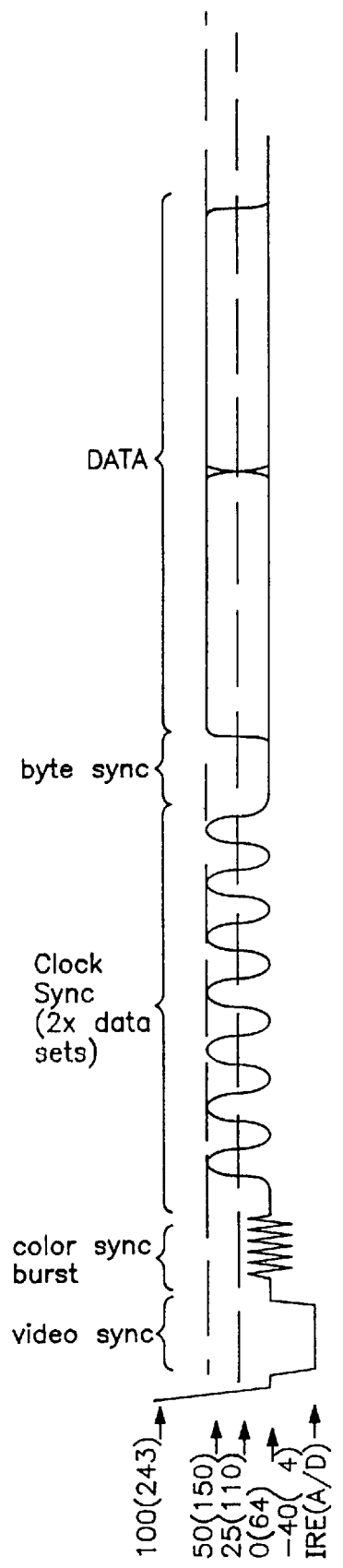
FIG. 3 is a diagram of a portion of a closed caption signal.

Referring now to FIG. 3, the video signal includes the closed caption signal following the byte synchronization signal. The closed caption signal suitably comprises: a horizontal synchronization pulse; a color burst; a clock synchronization signal; a byte synchronization signal; and a data block. The horizontal video synchronization pulse is suitably provided in accordance with conventional television specifications to indicate the beginning of the line. Following the video synchronization pulse, the color burst in the chroma carrier is transmitted for demodulation of the transmitted color signals as previously described.

After the color burst, the transmitter 102 transmits the run-in clock synchronization signal to facilitate synchronization of the receiver 106 with the video signal. The duration of the closed caption clock synchronization signal is typically seven cycles long. After the clock synchronization signal, the transmitter 102 transmits the byte synchronization signal. For closed caption data, the byte synchronization signal suitably comprises a three-bit framing code. Thus, the arrival of the three-bit framing code indicates that the data block is about to follow. Accordingly, the transmitter 102 transmits the data. For a closed caption transmission, the data block comprises only two bytes containing the actual data associated with the closed caption transmission.

Referring again to FIG. 1, the transmitter 102 transmits the video signal including the teletext and/or the closed caption information to the receiver 106 via the communications medium 104. The communications medium 104 suitably comprises any type of medium, system and/or technique for transmitting signals. For example, the communications medium 104 suitably comprises a broadcast system, cable, wireless communications, fiber optics, cellular systems, microwave transmissions, or any other type of communication system.

Figure 4:
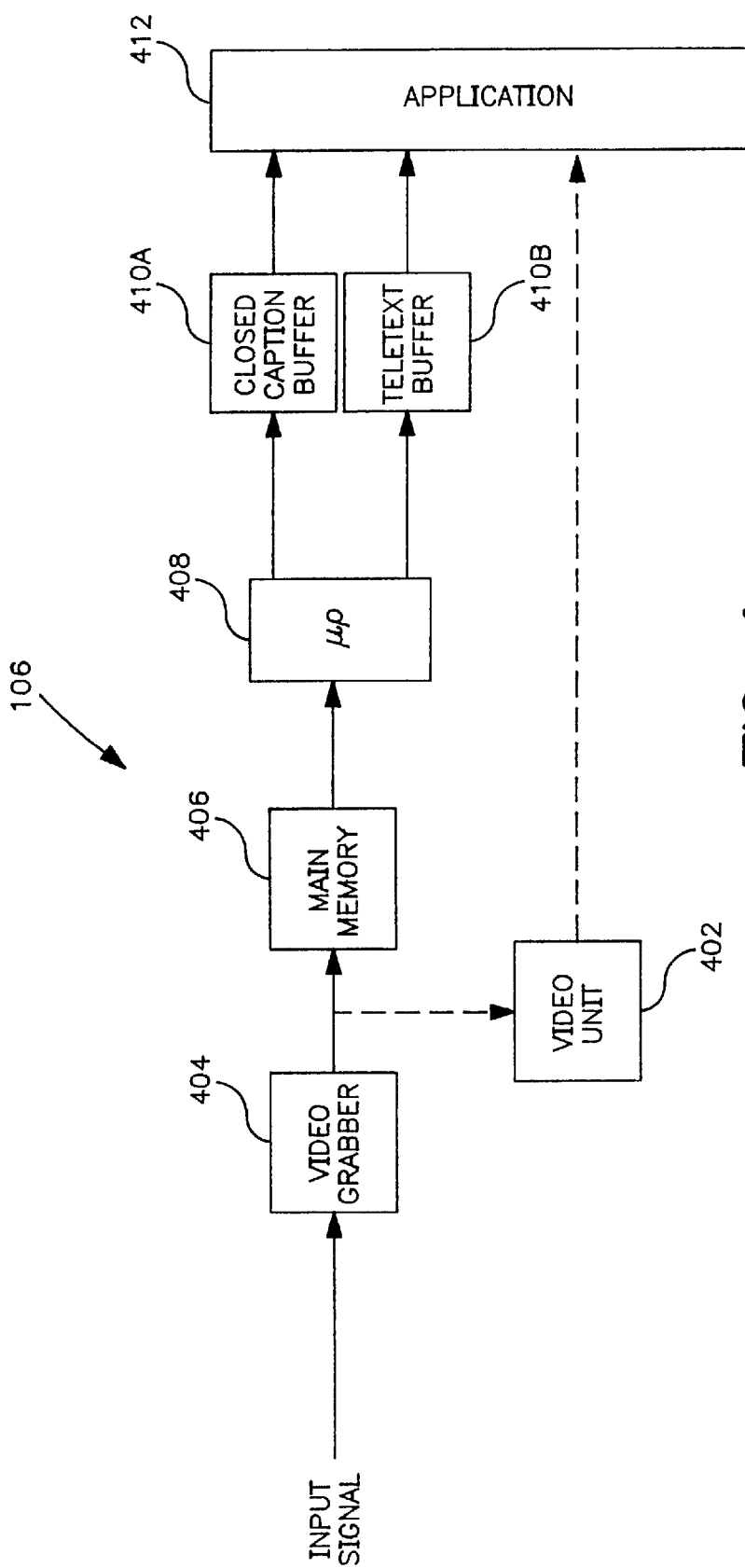
FIG. 4 is a block diagram of a receiver according to various aspects of the present invention.

The signal generated by the transmitter 102 is transmitted via the communications medium 104 to the receiver 106. The receiver 106 is preferably configured to extract the teletext and/or the closed caption data from the video signal. In particular, referring now to FIG. 4, a receiver 106 according to various aspects of the present invention suitably comprises: a sampling unit 404 for sampling the incoming signal; a memory 406; a processing unit 408, such as a microprocessor; and a set of output buffers 410A–B. The receiver 106 may optionally include a conventional video unit 402 for generating images on a display based on the video signal. The video unit 402 is suitably a conventional video system for receiving the incoming signal and generating an image on a display. It should be noted, however, that the video unit 402 is not a necessary component of a decoding system according to the present invention, and is included in the present embodiment solely for purposes of illustrating a possible configuration of a decoding system according to various aspects of the present invention. In many configurations, the video unit is entirely omitted. In a preferred embodiment, the receiver comprises a conventional, general purpose, non-dedicated computer. For the purposes of this specification, a "general purpose" or "non-dedicated" computer comprises any processor-based system that is not configured primarily to decode the signal from the transmitter 102, such as a standalone desktop or laptop personal computer, a clientserver network terminal, or a processor-based or "smart" television system.

The video signal is suitably provided to the sampling unit 404 via a conventional receiving apparatus, such as a broadcast receiver, a cable receiver, or a satellite receiver. The sampling unit 404 samples the video signal at periodic intervals and stores the samples in the main memory 406. As data is collected in the main memory 406, the processing unit 408 periodically retrieves data from the main memory 406 and processes some or all of the information. The processing unit 408 suitably comprises any component capable of performing the present functions, including a microprocessor, a digital signal processor, or a microcontroller. In the present embodiment, the processing unit 408 comprises a microprocessor. Specifically, the processing unit 408 may be configured to perform other functions, such as execution of conventional computer functions, as the sampling unit 404 stores video signal information in the main memory 406. The processing unit 408 suitably periodically reads the information from the main memory 406, processes the information, and returns to the execution of conventional computer functions.

The processing unit 408 may be programmed to extract the teletext and closed caption data from the incoming signal and provide the resulting data to the output buffers 410A–B. The data in the output buffers 410A–B may be used in any manner like any digital data signals, for example, to receive news, download files or programs, accumulate data, and the like. More particularly, the sampling unit 404 suitably collects data from the incoming signal, for example by sampling, converts the analog signal to a digital representation, and transfers the digital data to the main memory 406. In the present embodiment, the sampling unit 404 comprises a video grabber unit dedicated to acquiring raw data. In one embodiment, the video grabber is a component of another system as well, such as a television or computer video system. The video grabber samples the incoming signal and performs a transfer of the data to the main memory 406, for example at a rate of 24.5454 million samples per second during the VBI. The sampling unit 404, however, may suitably comprise any system for providing digital data to the processing unit 408 for analysis. The main memory 406 suitably comprises any sort of memory, but preferably provides high speed access and storage, such as a conventional random access memory (RAM).

The processing unit 408 suitably comprises a conventional microprocessor for analyzing the digitized signal and extracting the closed, caption and teletext data. For example, the microprocessor may be a PENTIUM® processor from INTEL® Corporation. The extracted data is written to the buffers 410A–B, which suitably comprise memory blocks. The size of the memory blocks may be configured, suitably dynamically, according to the number of lines containing data in the incoming signal. The data is now ready to be used by the application 412.

The processing unit 408 suitably performs multiple functions in the present system. For example, the processing unit suitably comprises the central processing unit for a conventional computer system. In the present embodiment, the processing unit 408 also suitably extracts the closed caption and teletext data from the video signal. Accordingly, the processing unit 408 suitably includes two software modules to extract the relevant data from the signal. It should be noted that the extraction process described is implemented in software and executed by the processing unit. Although discrete components are disclosed, the present embodiment implements the components as software modules executed by the processing unit. Nonetheless, alternative embodiments may include dedicated hardware components or a programmable device for performing various individual functions that are executed by the processing unit in the present embodiment.

Figure 6:
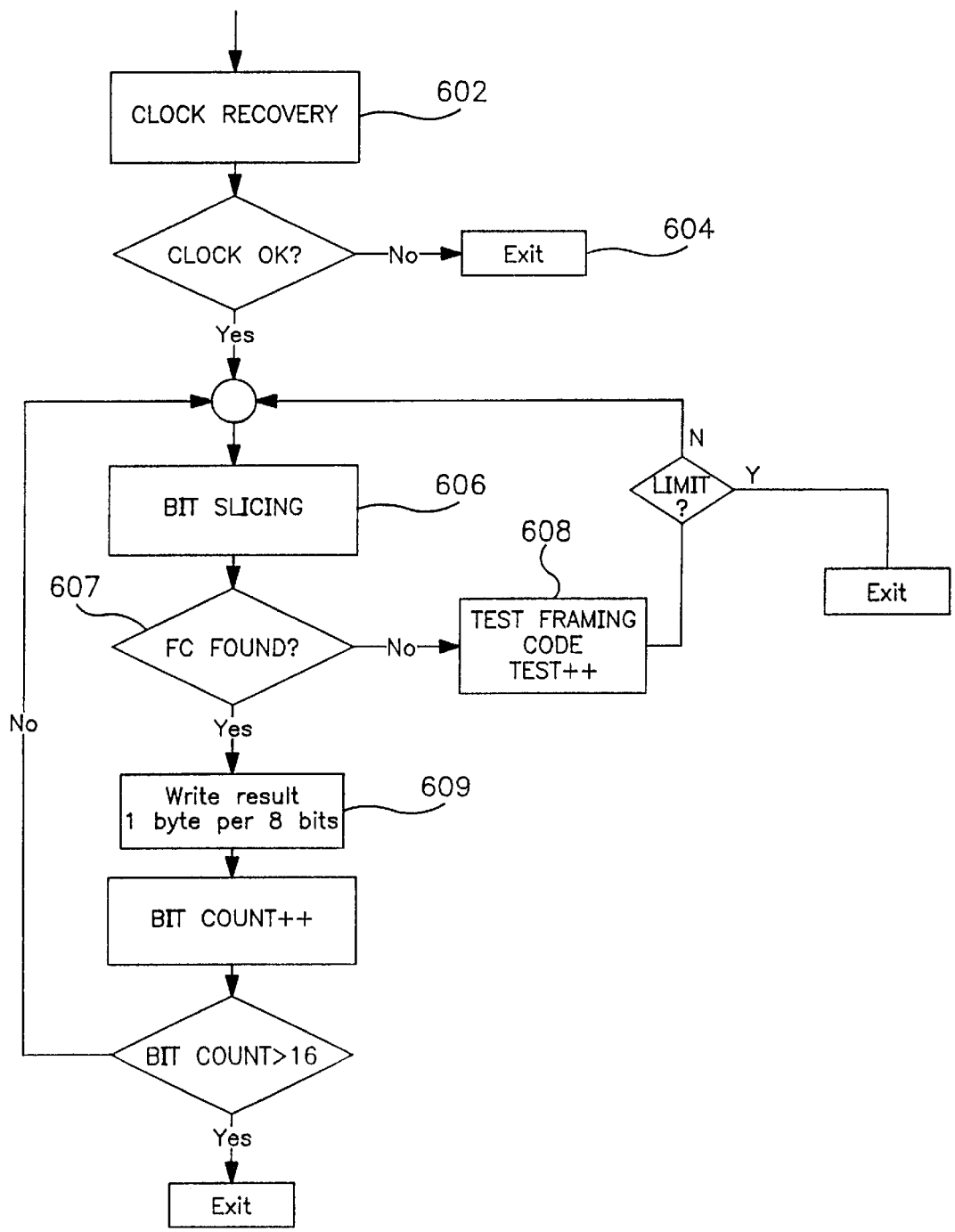
FIG. 6 is a flow diagram of a process for tracking and extracting closed caption data from a digitized television signal.

In particular, referring now to FIG. 6, to extract the closed caption data, the processing unit 408 suitably includes a closed caption module 500 for identifying portions of the video signal including closed caption data and extracting the data. The closed caption module 500 suitably reads the digital representation of the signal from the main memory 406, recovers the clock synchronization signal, identifies the framing code, and extracts the binary data from the incoming signal.

In the present embodiment, the closed caption module 500 initially executes a clock recovery process to identify the clock synchronization portion of the video signal (step 602). If the clock synchronization signal is not recovered, for example, if the clock synchronization signal is not detected in the sampled data by the closed caption module 500, the analysis terminates (step 604). It should be noted that this automatic signal detection feature may be configured to be selectively disabled. If the clock synchronization signal is detected in the incoming signal (step 605), the closed caption module 500 uses the clock synchronization signal to extract the binary closed caption data from the signal via a bit slicing and shifting process (step 606).

The closed caption module 500 suitably monitors the extracted binary data to identify a synchronization pattern from the extracted bits (step 607). In particular, the closed caption module 500 of the present embodiment may analyze the binary data for the three-bit framing code preceding the data block. The closed caption module 500 suitably analyzes the binary data for a preselected period or number of bits. If the framing code is not detected within the preselected period, the analysis is discontinued. If the framing code is detected, the closed caption module 500 continues to perform the bit slicing process to extract the incoming closed caption binary bits, for example the conventional 16 closed caption bits, from the incoming signal. The extracted information is then written to the output buffer 410 (step 609).

Figure 5:
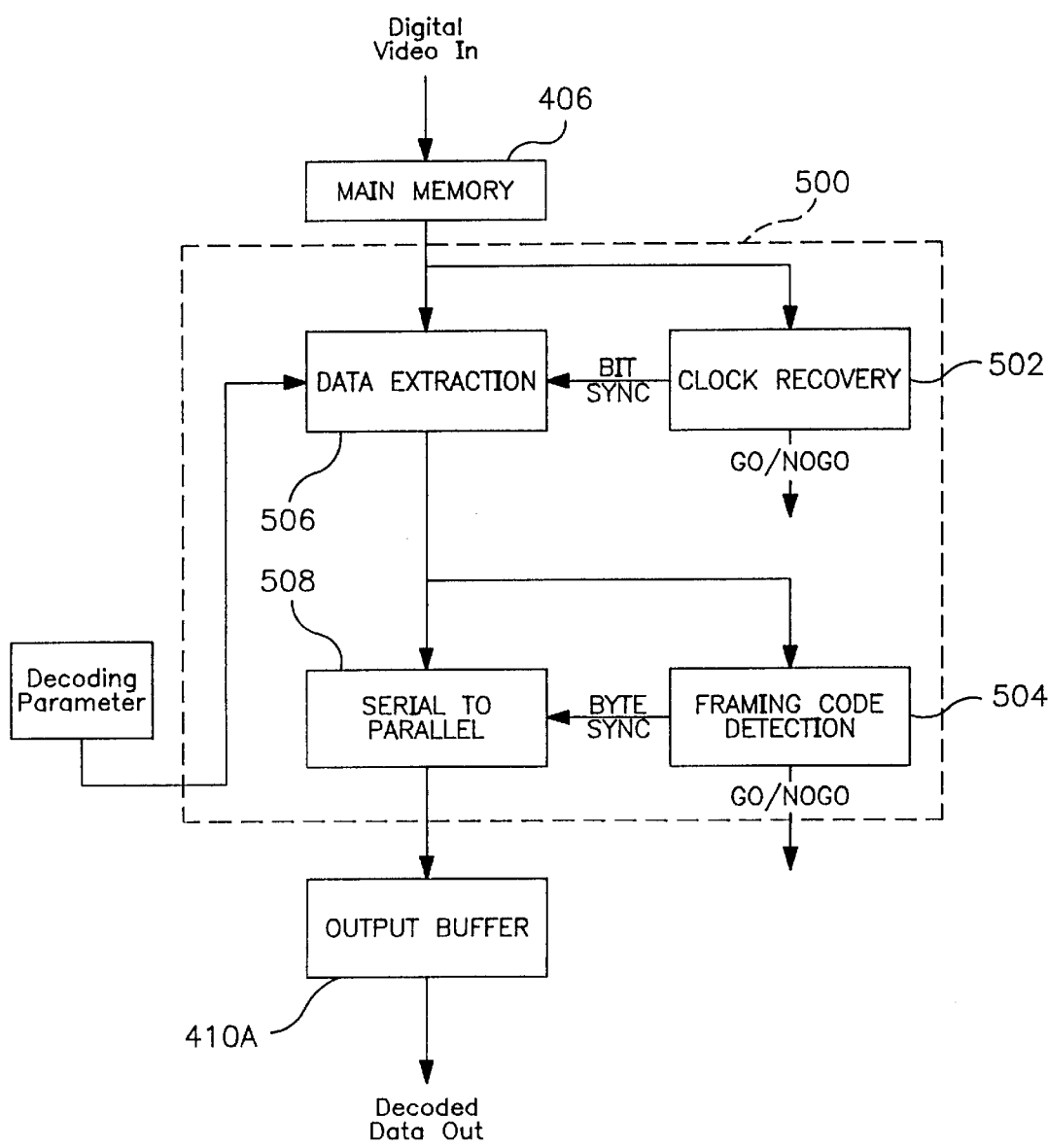
FIG. 5 is a block diagram of a system for analyzing closed caption data.

The closed caption data retrieval process is suitably implemented by a set of software modules executed by the processing unit 408. For example, referring now to FIG. 5, the closed caption module 500 suitably includes a clock recovery module 502; a data extraction module 506; a framing code detection module 504; and a serial-to-parallel module 508. The clock recovery module 502 is suitably configured to determine whether the clock synchronization signal is present, determine phase characteristics of the incoming signal relative to the samples, and to provide information to the data extraction module 506 to synchronize the bit slicing function. In addition, the clock recovery module 502 suitably measures the amplitude of the incoming signal and determines the DC signal offset. Further, does not include closed caption data.

In a preferred embodiment, the clock recovery module 502 reads samples of the digitized video signal from the main memory 406 and processes them according to a suitable algorithm to recover the clock synchronization signal. A conventional closed caption signal has a bit rate of 0.5035 MHz. The sampling unit 404 suitably samples the incoming signal at a sufficiently high rate to track and recover the clock synchronization signal and the binary data in the video signal. In the present embodiment, the sampling unit 404 acquires samples at 24.5454 MHz. Thus, the sampling unit 404 acquires approximately 48.75 samples per bit of the closed caption data. Preferably, the sampling unit 404 acquires data at a rate at least four times higher than the data rate of the incoming binary signal. The clock synchronization signal operates at the same frequency as the bit rate, so the sampling unit 404 acquires 24.375 samples per half-cycle of the clock synchronization signal. Consequently, the clock recovery module 500 may analyze the closed caption signal to a phase error of less than eight degrees, which is sufficiently precise to effectively provide bit synchronization information to the data extraction module 506. If greater precision is required or desired, however, the sampling rate may be increased and/or the clock recovery module may provide enhanced signal analysis, such as through an interpolation analysis of the sampled data.

In the present embodiment, the clock recovery module 502 analyzes only a portion of the signal to ensure analysis of valid data. For example, in the present embodiment, the clock recovery module 502 suitably ignores the samples acquired during the first 9.4 microseconds after the falling edge of the horizontal synchronization pulse, to account for the minimum delay between the synchronization pulse to the rising edge of the first cycle of the clock synchronization signal.

In addition, because the initial cycles of the clock signal may not be stable, for example due to attenuation caused by a superimposed echo, the clock recovery module 502 may discard some of the initial clock synchronization signal cycles prior to recovering the clock synchronization signal, for example the first two cycles, and reserve analysis for the remaining cycles. The clock recovery module 502 then suitably analyzes the sample data to identify certain characteristics of the incoming signal to facilitate bit synchronization or bit decoding.

Figure 7A:
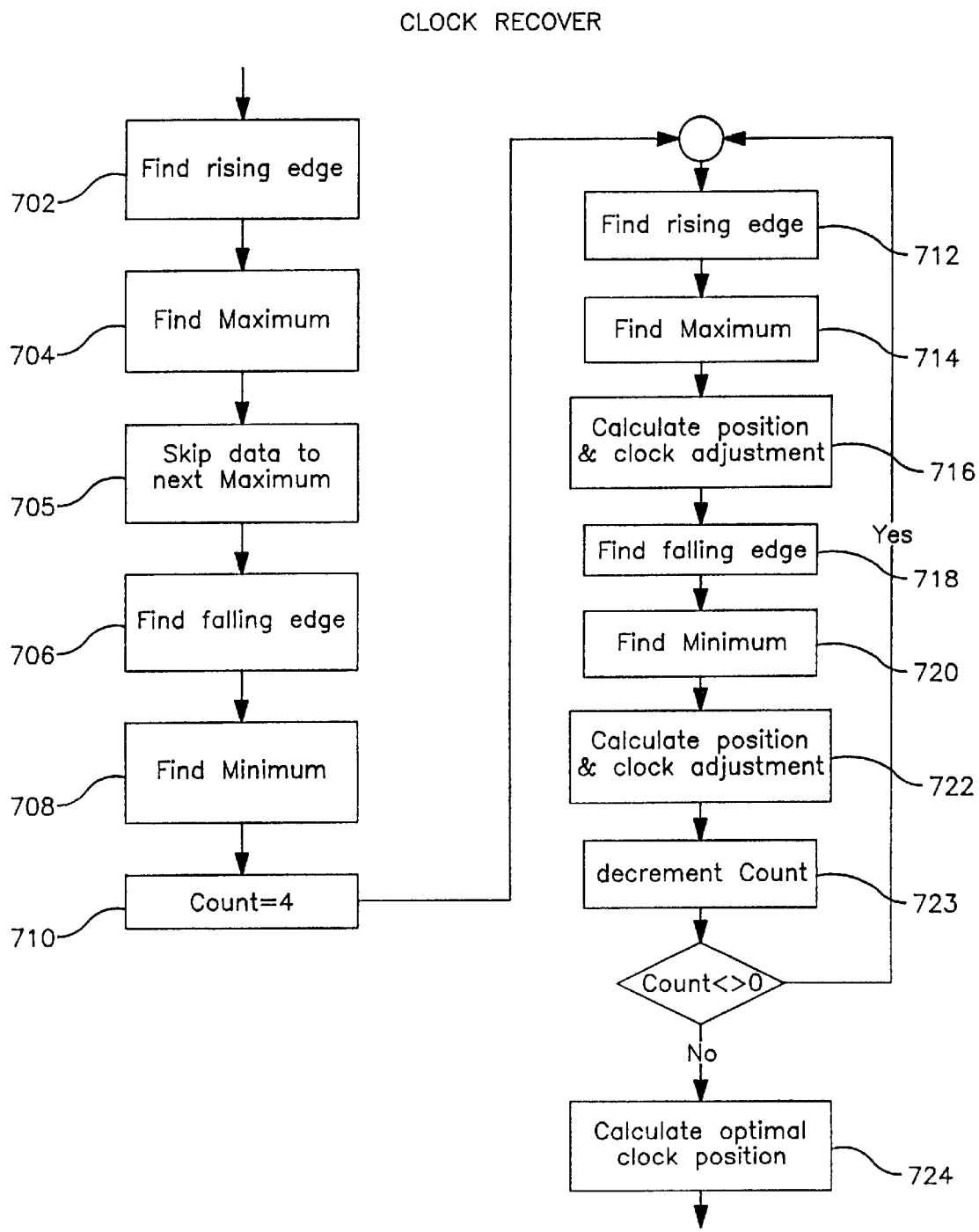
Figure 7B:
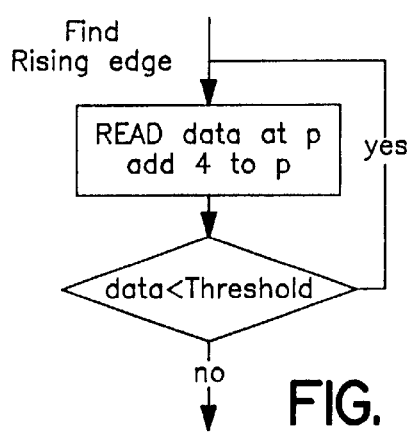
Figure 7C:
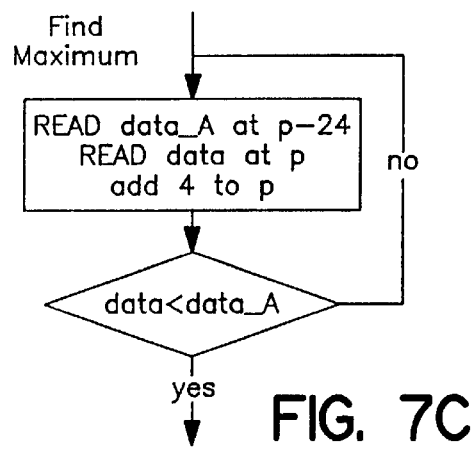
Figure 7D:
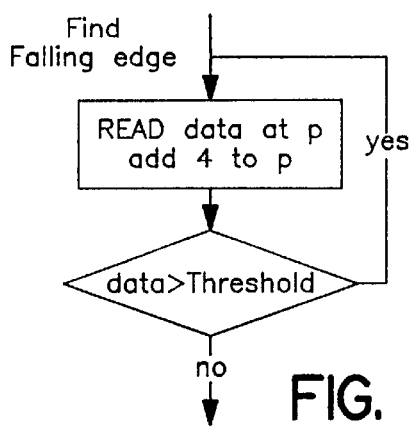

In particular, referring now to FIGS. 7A–B, the clock recovery module 502 suitably first seeks the rising edge of the first cycle (step 702), for example by searching for the first sample exceeding a threshold value (FIG. 7B). The threshold is preferably selected to reduce the likelihood that the preceding color burst is not mistaken for the rising edge of the clock synchronization signal, for example a value signifying 0.44 volt (based on a one volt peak-to-peak video signal). In addition, because the sampling unit 404 acquires over 48 samples per cycle of the closed caption clock synchronization signal, certain samples may be selected for analysis and the remainder ignored to improve the efficiency of the analysis. In the present embodiment, the clock recovery module 502 initially reads a first sample from main memory 406 following the initial 9.4 microsecond delay and advances to the next sample to be analyzed.

If the amplitude of the first sample does not exceed the selected threshold, the clock recovery module 502 advances to the next sample to be analyzed, in this example skips four samples, and again compares the value of the sample to the threshold. Thus, the present clock recovery module 502 analyzes only one of every four samples in this example for the clock synchronization signal. The process repeats until a sample value exceeds the threshold. Upon identifying a sample having a value exceeding the selected threshold, the clock recovery module 502 designates the sample as the rising edge of the cycle.

After detection of the rising edge, the clock recovery module 502 then seeks a maximum point in the clock synchronization cycle (step 704). For example, referring now to FIG. 7C, the clock recovery module 502 reads the values of the current sample and a sample that preceded the current sample by a selected number of samples. Preferably, the number of preceding samples is selected to enhance the extracted data, for example to provide optimal gain. If the sampling unit takes signals at a much higher frequency than the data signal or clock signal frequency, for example about an order of magnitude higher, the number of preceding samples may be selected to correspond to a 180 degree phase shift. In the present embodiment, the sample 24 samples prior to the current sample is read, which corresponds to a 180 degree shift at a sampling rate of 24.375 samples per half-cycle of the clock synchronization signal. Again, four samples are skipped. If the value of the current sample is less than that of the older sample, then the maximum has not been identified. If the value of the current sample is greater than or equal to the value of the older sample, the current value is designated as the maximum. The clock recovery module 502 thus operates as a comb filter where the center of the first lobe of the frequency response corresponds to the closed caption clock synchronization signal's frequency. This improves the selectivity of the clock for the peak detector.

Upon detection of the maximum, the clock recovery module 502 advances to the maximum of the next cycle, for example by skipping the next 48 samples (for a 24.5454 MHz sampling rate) following the detected maximum (step 705). The clock recovery module 502 then seeks the falling edge of the present cycle (step 706). This process suitably amounts to the converse of the process for identifying the rising edge of the clock synchronization signal. For example, referring now to FIG. 7D, the clock recovery module 502 reads the current sample and skips four samples. If the amplitude of the read sample exceeds the selected threshold, the clock recovery module 502 continues searching for the falling edge at the next sample, and again skips four samples. This process suitably repeats until a sample value does not exceed the threshold. If the present sample is below the threshold, however, the falling edge, or at least an approximation of the falling edge, has been identified.

Figure 7E:
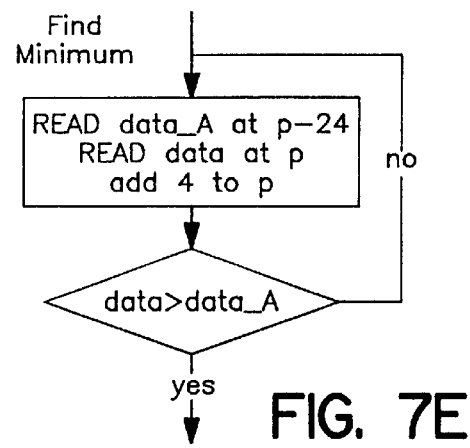

Upon identification of the falling edge, the clock recovery module 502 suitably seeks the minimum portion of the cycle (step 708). Referring now to FIG. 7E, this process suitably comprises the converse of the process to find the maximum. The clock recovery module 502 reads the value of a current sample and a sample that preceded the current sample by 24 samples, and then skips four samples. If the value of the current sample is greater than that of the preceding sample, then the minimum has not been identified. The clock recovery module 502 consequently repeats the process. If the value of the current sample is less than or equal to the value of the older sample, the current value is designated as the minimum.

Thus, the clock recovery module 502 identifies the rising edge and the maximum of the first cycle to exceed the threshold and the falling edge and minimum of the second. At this point, the detection of the clock synchronization signal is considered verified. The first two cycles have been processed for initial estimates of the positions of the maximum and minimum and the rising and falling edges. In addition, the data is assumed to be stable after the first two cycles to exceed the threshold defining the rising edge. It should be noted that if the initial cycles of the clock synchronization signals are so attenuated as to never exceed the threshold, the attenuated cycles are ignored.

Referring again to FIG. 7A, the clock recovery module 502 then suitably proceeds to establish the optimal clock position by tracking the maximum and minimum portions of the signal. For example, a counter is suitably set according to the number of cycles in the closed caption clock synchronization signal to be analyzed, such as four (step 710). Next, the next rising edge and the maximum of the next cycle are identified, for example as described above (steps 712 and 714).

As the rising edge and the maximum are identified, however, the clock recovery module 502 now suitably stores a value corresponding to the duration between the previous minimum and the most recently identified maximum. For example, with each repetition of the searches for the rising edge and the maximum, the position value is incremented by four. Upon detection of the maximum, the position value is compared to the ideal duration between the previous minimum and the current maximum, which in this case is 24+3/8 samples. The clock recovery module 502 then adds the results of the comparison to an adjustment value, which is ultimately used to determine the optimal clock position or phase position adjustment (step 716). In addition, the clock recovery module 502 suitably adds the value of each sample to a data average value stored, for example, in memory 406. The accumulated data average value may be ultimately used to determine an average sample value and a DC offset.

Upon identification of the maximum, the value of the sample at the maximum is stored. The difference between the value of the maximum and the preceding minimum is suitably compared to a selected threshold amplitude to ensure the analysis of valid data. If no value for a preceding minimum has been stored, then a default minimum, such as 0.28 volt (for a peak-to-peak video signal of 1.0 volt) may be provided. If the difference is less than the threshold amplitude, such as 0.14 volt, then an error message is returned and the data discarded. If the difference is greater than or equal to the threshold amplitude, however, the analysis continues.

The clock recovery module 502 then suitably proceeds to find the falling edge (step 718) and the minimum (step 720). Like the rising edge and maximum analyses, the falling edge and minimum analyses continue to update the data average value and the position value with each repetition. The clock recovery module 502 then suitably checks the amplitude of the difference between the preceding maximum and the current minimum to ensure that it is at least equal to 0.14 volt. Similarly, the clock recovery module 502 then suitably computes the optimal position of the minimum and adds it to the optimal clock position adjustment value (step 722). The repetition counter is then decremented (step 723).

This process repeats four times, suitably once for each of the remaining clock synchronization cycles. Upon completion of the four repetitions, the clock recovery module 502 suitably checks the frequency of the tracked signal to ensure the detection of valid data. For example, the clock recovery module 502 suitably determines the duration between the sample at which the search for the first rising edge began (following the discarded initial cycles) and the sample at which the final minimum was detected. If the duration is out of range compared to that required for four cycles of the clock synchronization signal, then an error message is returned and the data is discarded.

If the duration is within an acceptable range, then the adjustment value is averaged, for example by dividing the adjustment value by eight, which corresponds to the number of adjustments added to the adjustment value. The averaged adjustment value corresponds to an approximate phase error from the maximum or minimum of the incoming signal. The averaged adjustment value may then be used to determine an optimal clock position (step 724), which may then be used to synchronize the extraction of the binary data bits from the byte synchronization and data block portions of the signal.

In addition, the clock recovery module 502 suitably determines the average data value for the samples analyzed. The data value average may be compared to an expected amplitude average, and the difference stored as a DC offset value. The DC offset value may be used by the data slicing process to establish the appropriate thresholds for determining logical values of the binary data and to remove DC offset prior to signal processing.

Referring again to FIGS. 5 and 6, if the clock recovery process successfully recovers the clock synchronization signal (step 605), the closed caption module 500 initiates the data extraction module 506 using the recovered clock synchronization signal information to synchronize the extraction of the binary data. For example, the data extraction module 506 suitably implements a bit slicing process which operates in conjunction with the clock synchronization signal information to reconstruct the binary data embedded in the video signal (step 606). The data extraction module 506 suitably uses the data generated by the clock recovery module 502 to identify relevant samples and recover binary data in the signal. The bit slicing process is then applied to the identified relevant samples to assign appropriate binary values to the corresponding bits.

In the present embodiment, the data extraction module 506 selects particular samples for analysis based on the adjusted clock synchronization signal information. For example, the samples most likely to be closest to the rising and falling edges of the data bits may be identified based on the clock synchronization information. Similarly, the samples closest to the projected center of each bit signal, and hence those with the highest integrity, may be identified. Thus, the data extraction module 506 selects a suitable number of samples corresponding to each bit, for example one, for analysis in the bit slicing process.

The bit slicing process suitably assigns a binary value to each relevant sample. In the present embodiment, the data extraction module 506 compares each relevant sample of the incoming signal to a selected threshold, for example a threshold corresponding to 0.52 volt (based on a peak-to-peak voltage of 1.0 volt) to establish a logical value for the signal. If the sample exceeds the threshold, it is designated as a logical "one", and if not, the signal is designated as a logical "zero". If more than one sample is analyzed for a particular bit, the data extraction module suitably assigns the binary value according to a suitable algorithm, for example a majority value with respect to the threshold. The data extraction module 506 then suitably provides the serial binary data to the framing code detection and serial-to-parallel modules.

As the bit slicing process executed by the data extraction module 506 proceeds, the framing code detection module 504 searches the resulting binary data for a valid framing code indicating that closed caption data is to follow (step 607). The framing code provides byte synchronization information to align the incoming bit stream on a byte boundary. It is also used to verify that a closed caption line has been identified. For conventional closed caption data, the framing code comprises the three bit code 1-0-0.

In the present embodiment, the framing code detection module 504 reads the bits in the register as they are stored and compares them to the desired framing code. If the desired code is received, the serial-to-parallel module 508 begins converting the following 16 serially received bits into two bytes of parallel data (step 609 in FIG. 6). If the framing code is not detected, the framing code detection module 504 suitably waits for the next bit to be received in the register, and repeats the analysis. The framing code detection module 504 suitably repeats the analysis for a selected number of bits or time period. If the framing code is not detected within the selected period or number of bits, the analysis process terminates.

When the framing code is detected following the clock synchronization signal, the subsequent data, for example 16 bits of data, is provided to an 8-bit portion of the output buffer 410 such that the first bit of the data signal is aligned with the first bit of the buffer 410A by the serial-to-parallel module 508. The result is a serial-to-parallel conversion of the incoming closed caption binary data, which may then be provided to an application, a device, or otherwise used.

Referring again to FIG. 4, the processing unit 408 also suitably includes an analogous system for teletext data extraction. In particular, referring to FIGS. 8 and 9, the processing unit 408 suitably includes a teletext module 800 for identifying portions of the video signal including teletext data and extracting the data. The teletext module 800 suitably reads the signal from the main memory 406, recovers the clock synchronization signal from the incoming signal, identifies the framing code in the byte synchronization signal, and extracts the data. In addition, the teletext module 800 suitably performs several other signal processing steps, such as data interpolation, equalization, echo cancellation, and error detection.

For example, a suitable teletext module 800 comprises: a clock recovery module 802; a data interpolation module 804; an equalizer module 806; an echo cancellation module 808; a framing code detection module 810; a data extraction module 812; a Hamming decoder module 814; and a serial-to-parallel module 816. The clock recovery module 812 suitably identifies the clock synchronization signal to provide bit synchronization for the teletext module 800 (step 902). If the clock synchronization signal is not present, the clock recovery module suspends further processing of the current line of the incoming signal (step 904). It should be noted, however, that this automatic data detection function is suitably configured to be selectively disabled.

If the clock recovery module 802 identifies the clock synchronization signal, it provides clock synchronization signal information to the data interpolation module 804, which suitably refines the synchronization of the bit slicing function with the embedded binary data. The data interpolation module 804 suitably interpolates the data from the incoming samples to facilitate optimal synchronization of the sample analysis with the teletext data position and to convert the data bit rate to the original frequency (step 906). The equalizer module 806 and the echo cancellation module further perform filtering and amplitude normalization to correct errors induced by echo signals (steps 908 and 910). The data extraction module 812 then suitably performs a bit slicing process on the amplitude normalized data sample (step 912).

Following the bit slicing, the framing code detection module 810 suitably surveys the incoming bit stream to identify the framing code in the signal (step 913). When (and if) the framing code is identified, the framing code detection module 810 generates byte synchronization information, which may be used by the serial-to-parallel module 816. The serial-to-parallel module 816 suitably accumulates data (step 914) as the data is extracted from the data extraction module 812 and aligns bits on the byte boundaries with the signal byte synchronization information from the framing code module 810. The Hamming decode module 814 suitably extracts the data information from the Hamming encoded byte (step 916). The Hamming decode module 814 and the serial-to-parallel module 816 store data bytes in the output buffer 410B (step 918).

The clock recovery module 802 and data interpolation module 804 are suitably configured to determine the optimal position for identifying the binary data embedded in the signal and synchronize the bit slicing function accordingly. In addition, the clock recovery module 802 may further measure information such as a DC signal offset and signal amplitude, as well as detect an invalid input signal and, if so, terminate further analysis of the signal.

For example, in a preferred embodiment, the clock recovery module 802 reads the digitized samples of the video signal from a buffer in the main memory 406 and processes the samples according to a suitable algorithm to recover the clock synchronization signal. According to the NABTS specification, a teletext signal has a bit rate of 5.7272 MHz, and in the present embodiment, the sampling unit 404 acquires samples at 24.5454 MHz. Thus, the sampling unit acquires approximately 4.2857 samples per bit of the teletext data.

The samples acquired during the first 9.4 microseconds after the falling edge of the horizontal synchronization pulse are suitably ignored to account for the minimum delay between the synchronization pulse to the rising edge of the first cycle of the clock synchronization signal. Like the closed caption clock recovery module 502, the teletext recovery module 802 suitably analyzes only a portion of the signal to ensure analysis of valid data. In a similar manner, the first two cycles of the clock synchronization signal are suitably subjected to minimal processing and the remaining cycles are analyzed to generate the clock synchronization information.

Figure 10A:
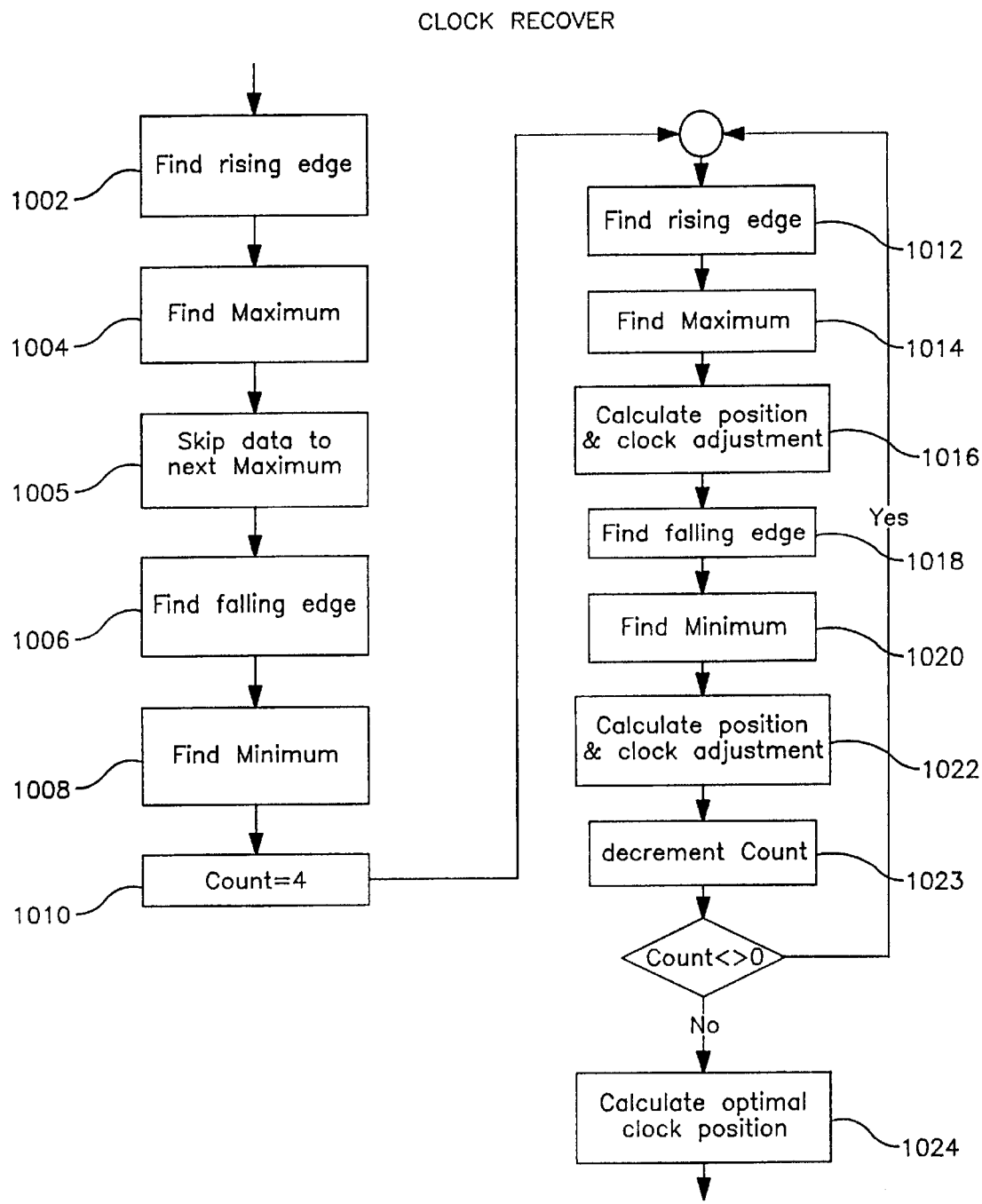
Figure 10B:
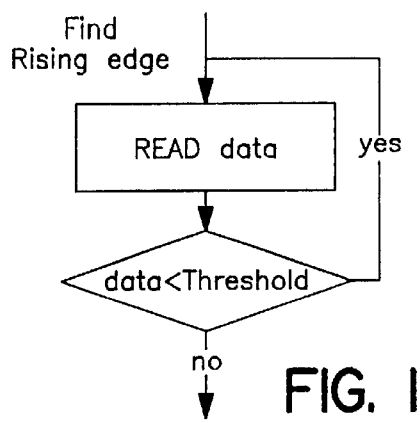
Figure 10C:
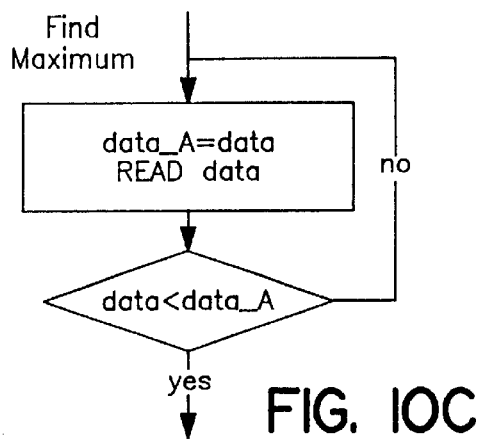
Figure 10D:
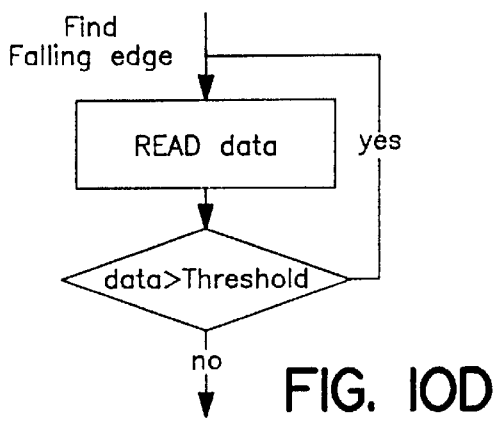

Referring now to FIG. 10A, the clock recovery module 802 first seeks the rising edge of the first cycle (step 1002), for example by searching for the first sample exceeding a threshold value (FIG. 10B). The amplitude of the teletext clock synchronization signal is typically higher than that of the closed caption clock synchronization signal, so the threshold is accordingly higher, for example approximately 0.52 volt (based on a one volt peak-to-peak video signal). If the amplitude of the first sample does not exceed the selected threshold, the clock recovery module 802 advances to and reads the next sample in the buffer. Because the teletext clock synchronization signal is a much higher frequency than that of the closed caption clock synchronization signal, all of the samples in the teletext clock synchronization signal may be analyzed.

When the rising edge is detected, the clock recovery module 802 then seeks a maximum point in the clock synchronization cycle (step 1004). For example, referring now to FIG. 10C, the clock recovery module 802 compares the value of a current sample and a preceding sample. If the value of the current sample is greater than or equal to that of the preceding sample, then the cycle value is still rising and the maximum has not yet been identified. The clock recovery module 802 advances to the next sample, and repeats the process. If the value of the current sample is less than the value of the preceding sample, the preceding value is designated as the maximum.

Upon detection of the maximum, the clock recovery module 802 advances to look for the next maximum of the next cycle, for example by skipping the next eight samples following the first identified maximum (step 1005). The clock recovery module 802 then seeks the falling edge of the present cycle (step 1006). This process suitably amounts to the converse of the process for identifying the rising edge. For example, referring now to FIG. 10D, the clock recovery module 802 reads the current sample and compares it to the selected threshold. If the amplitude of the sample exceeds the selected threshold, the data is ignored and the clock recovery module begins searching for the falling edge again with the next sample. If the present sample is below the threshold, however, the falling edge has been identified.

Figure 10E:
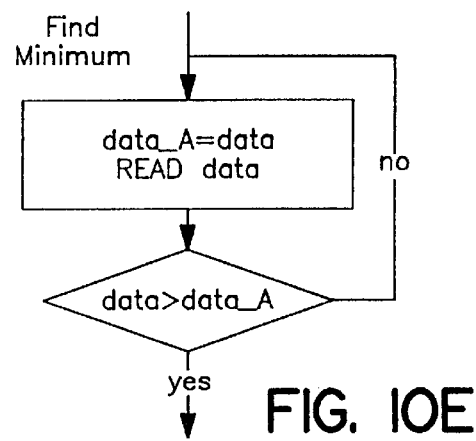

Upon identification of the falling edge, the clock recovery module 802 seeks the minimum portion of the cycle (step 1008). Referring now to FIG. 10E, this process is suitably the converse of the process to find the maximum. The clock recovery module 802 reads the value of a current sample and a preceding sample. If the value of the current sample is less than or equal to that of the preceding sample, then the minimum has not been identified. The clock recovery module 802 advances to the next sample, and repeats the process. If the value of the current sample is greater than the value of the preceding sample, the preceding value is designated as the minimum.

Thus, the clock recovery module 802 has identified the maximum of the first cycle to exceed the threshold and the minimum of the second cycle to exceed the threshold. At this point, the assertion of the teletext clock synchronization signal has been verified. The first two cycles to exceed the rising edge threshold have been processed and the data is assumed to be stable. Referring again to FIG. 10A, the clock recovery module 802 then attempts to establish the optimal clock position by tracking the maximum and minimum portions of the signal. For example, a counter is suitably set to four, which is equal to the number of cycles to be analyzed in the teletext clock synchronization signal (step 1010).

Next, the subsequent rising edge and the maximum of the next cycle are identified (steps 1012 and 1014). The clock recovery module 802 then computes the optimal position of the maximum and adds it to the optimal clock position adjustment (step 1016). Further, the clock recovery module suitably accumulates data to facilitate validation of the amplitude and frequency of the signal and to compute the DC offset of the signal. Moreover, the clock recovery module 802 collects data to facilitate the data interpolation process.

For example, the clock recovery module 802 suitably searches for the rising edge of the present cycle as described above. After each sample is read and compared to the threshold, the value of the sample is added to an accumulator to compute, at a later point in the analysis, a data average value. The accumulated data average value is suitably ultimately used to determine an average sample value and a DC offset. In addition, for each repetition of the search for the rising edge, a position value is incremented to reflect the addition of one sample.

Upon detection of the rising edge, the clock recovery module 802 searches for the maximum of the cycle. Like the search for the rising edge, after each sample is read and compared to the preceding sample value, the value of the sample is added to a data average value. Likewise, for each repetition of the search for the maximum, the position value is incremented to reflect the addition of one sample. In addition, as each sample is compared to the preceding sample, the value of the sample preceding the current sample by two samples is stored. Thus, the value of the current sample and the two preceding samples are stored in a buffer.

The position value is then compared to the ideal duration between the previous minimum and the current maximum, which in this case is 4+2/7 samples. The clock recovery module 802 then provides the values corresponding to the current sample and the preceding two samples to the data interpolation module 804. The data interpolation module 806 calculates a fractional adjustment of the position to approximate the value of the cycle at its center using a suitable algorithm. For example, in the present embodiment, if:

DATA=value of the current sample

DATA_A=value of the sample preceding DATA

DATA_B=value of the sample preceding DATA_A then the fractional adjustment is calculated according to the following equation:

$$ADJ=K*(DATA-DATA\_B)/(2*DATA\_A-DATA-DATA\_B)$$

where K is a constant, suitably related to the sampling rate relative to the data rate. In the present embodiment, K is suitably set at 3.5. For efficiency, the calculation of the ADJ value may be performed using a lookup table.

This equation generates a fractional adjustment that is proportional to the phase offset between the actual center of the cycle and the sample nearest the center point. If the sample is very near the actual centerpoint, then (DATA−DATA_B) is very small, generating a very small fractional adjustment. If the phase offset is large, the fractional adjustment value is large. The denominator comprises a normalizing factor to cancel variations in signal amplitude. The fractional adjustment value and the results of the comparison of the position value to the ideal position are then added to an adjustment value (step 1016).

Upon identification of the maximum, the difference between the value of the maximum and the preceding minimum is suitably compared to a threshold amplitude to ensure the analysis of valid data. If no value for a preceding minimum has been stored, then a default minimum, such as 0.28 volt (for a peak-to-peak video signal of 1.0 volt) may be provided. If the difference is less than the threshold amplitude, such as 0.14 volt, then an error message is returned and the data discarded. If the difference is greater than or equal to the threshold amplitude, however, the analysis continues.

The clock recovery module 802 then suitably proceeds to find the falling edge (step 1018) and the minimum (step 1020). Like the rising edge and maximum analyses, the falling edge and minimum analyses continue to update the data average value and the position value with each repetition. The clock recovery module 802 then suitably checks the amplitude of the difference between the preceding maximum and the current minimum to ensure that it is at least equal to 0.14 volt. Similarly, the clock recovery module 802 then suitably computes the optimal position of the minimum and adds it to the optimal clock position adjustment value (step 1022). The repetition counter is then decremented (step 1023).

This process repeats four times, once for each of the remaining clock synchronization cycles. Upon completion of the four repetitions, the clock recovery module 802 suitably checks the frequency of the tracked signal to ensure the detection of valid data. For example, the clock recovery module 802 suitably determines the duration between the sample at which the search for the first rising edge began (following the discarded initial cycles) and the sample at which the final minimum was detected. If the duration is out of range compared to that required for four cycles of the clock synchronization signal, then an error message is returned and the decoding process for the current video line terminates.

If the duration is within an acceptable range, then the adjustment value is averaged, for example by dividing the adjustment value by the number of values added to the accumulator, such as eight in the present example. The averaged adjustment value may then be used to determine an optimal clock position (step 724), which may then be used to synchronize the extraction of the binary data bits for the byte synchronization and data block portions of the signal. In addition, the clock recovery module 802 suitably determines the average data value for the samples analyzed. The data average may be compared to an ideal average, and the difference stored as a DC offset value. The DC offset value may be used by the data slicing process to establish the appropriate thresholds for determining logical values of the binary data and to remove DC offset prior to signal processing.

The data interpolation module 804 performs an interpolation function, such as described above, to identify the optimal clock position of the signal and more closely approximate the value of the signal at the exact center position of the data symbols. The value at the center position provides for maximum effectiveness of the equalizer module 806, echo cancellation module 808, and the data extraction module 812.

In addition, the data interpolation module 804 suitably performs a conversion of the sampling rate to the original data rate. The conversion process is suitably implemented using a digital interpolator filter, which is suitably a function performed by the processing unit 408. Referring now to FIG. 11, the interpolator filter 1102 is suitably comprised of a sampling rate converter 1104, a low pass filter 1106, and a decimation filter 1108. The interpolator filter preferably uses zero padding to provide a higher rate that is an exact multiple of the data rate. The sampling rate converter 1104 receives the input signal at the sampling rate (i.e. 24.5454 MHz), and generates an output signal at 28.6363 MHz, which is five times the data rate. The output of the sampling rate converter 1104 is provided to the low pass filter 1106, suitably comprising a finite-impulse response (FIR) filter, which suitably corrects the amplitude of every sample. The FIR filter 1106 provides an output signal at 28.6363 MHz to the decimation filter 1108, which generates a corresponding signal at an output rate corresponding to that of the teletext data rate, i.e. 5.7272 MHz.

The equalizer module 806 receives the interpolated data from the data interpolation module 804 and transfers processed data to the echo cancellation module 808. The equalizer module 806 compensates for amplitude and phase distortion caused by intersymbol interference. In the present embodiment, the equalizer module 806 is suitably configured as a digital adaptive equalizer, and is preferably adaptable to any amount of attenuation or DC offset of the incoming signal. Referring now to FIG. 12A, in the present embodiment, the equalizer module 806 comprises a modified zero-forcing equalizer including a transversal filter (or a finite impulse response filter) 1204, a decision device 1206, a coefficients compute unit 1208, and a coefficients damping unit 1210. Further, the equalizer module 806 suitably includes various features, such as a variable number of taps associated with the transversal filter 1204 and an error clipping component 1212.

The transversal filter 1204 suitably comprises a delay line tapped at data rate (or symbol rate) intervals. Each tap along the delay line is connected through an amplifier to a summing device that provides the output. The transversal filter 1204 is suitably programmable in three different lengths or numbers of taps. When the incoming data signal is clean, the transversal filter 1204 is configured to operate using zero taps. Using zero taps provides the fastest decoding, which facilitates the reduction of the load on the CPU. For more indistinct signals, the transversal filter 1204 may be configured using a greater number of taps, for example five taps (FIG. 12B). The greater number of taps provides better filtering but requires greater computing resources. If the incoming signal is very indistinct, a third mode configures the FIR filter with eleven taps (FIG. 12C). Initially, the number of taps may be set according to a preselected default parameter. The adjustment of the number of taps is suitably performed automatically based on the quality of the incoming signal. The quality of the incoming signal may be assessed according to any suitable technique, for example, according to the number of detected Hamming code errors, number of framing code errors, and/or the magnitude of the tap coefficients.

The values of the samples at the taps are multiplied by coefficients stored in the main memory 406. The amplification coefficients at the taps are controlled by the coefficient compute unit 1208 to subtract the effects of interference from symbols that are adjacent in time to the desired symbol. This process is repeated at regular intervals, for example, at every 15 symbols. The coefficients damping unit 1210 multiplies all coefficients by pre-determined damping values at regular intervals, for example every ¹⁄₆₀ of a second. This allows the equalizer module 806 to gradually reset the amplifier coefficients when no data signal is being received or the teletext module is unable to detect the received teletext data. This is useful to avoid divergence in the coefficients and helps to re-establish the proper coefficients when the signal reception changes, for example in the event that a TV antenna is rotated.

The summed output of the transversal filter 1204 is sampled at the symbol rate and then provided to the decision device 1206. The decision device 1206 computes the difference between the projected amplitude of a symbol and the data sample output of the transversal filter 1204. The resulting difference is used to calculate a new set of coefficients. The new set of coefficients is stored in a table in the main memory 406 for use by the coefficient compute unit 1208.

The equalizer module 806 may further include an error clipping component 1212 which compares the magnitude of the calculated error to a maximum threshold. If the magnitude exceeds the maximum threshold, the amount of correction applied to the coefficients compute unit 1208 is reduced, for example limited to the value of the threshold. If the magnitude is below the maximum threshold, however, the correction is applied without modification. In a similar manner, the error clipping component 1212 suitably compares the error magnitude to a minimum threshold. If the error magnitude is below the minimum threshold, no correction is applied to the coefficients compute unit 1208. If the magnitude exceeds the minimum threshold, however, the correction is applied without modification.

Alternatively, other types of adaptive filters can be used to perform similar f unctions, such as adaptive equalizers like an infinite impulse response (IIR), reverse adaptive equalizer, or any other suitable component. Further, in an alternative embodiment, instead of using a direct zero-forcing equalizer, a non-linear error table may be used to update the coefficients to avoid divergence when the transversal filter compensation is small.

The echo cancellation module 808 suitably receives the signal generated by the equalizer module and processes the signal to reduce the "ghost" effect caused by microreflection. In the present embodiment, the echo cancellation module 808 suitably comprises a module for implementing a method for ghost cancellation as described in U.S. patent application Ser. No. 08/631,346, filed Apr. 12, 1996. The echo cancellation module 808 suitably uses a last ten bits pattern in conjunction with a lookup table stored in the main memory 406 to provide the relevant correction. Preferably, the echo cancellation module 808 is called following the equalizer module 806, as the equalizer module 806 typically performs amplitude correction which facilitates the proper operation of the echo cancellation module 808.

It should be noted that many of the present components perform similar functions and may be used separately or in combination. The particular configuration may be adjusted according to the efficiency constraints of the system and processing resources. If the available processing resources are limited, the equalizer module 806, which typically consumes significant processing unit resources, especially when using a large number of taps, may be omitted or limited to a relatively low number of taps. The echo cancellation module 808, on the other hand, is typically relatively efficient, as it employs a lookup table to provide the signal processing function, but may not provide sufficient correction for certain applications and signals.

It should be further noted that the data interpolation module 804 performs a type of noise filtering function, and may be used without either of the equalizer module 806 or the echo cancellation module 808, with either individually, or with both. In the present embodiment, the equalizer module 806 uses data from the data interpolation module 804 to identify the optimal clock position; thus, if the data interpolation module 804 is omitted, the equalizer module 806 may be similarly omitted or reconfigured. In addition, any suitable interpolation algorithm may be implemented by the data interpolation module 804 to generate the appropriate signal. Furthermore, other components may be used to perform the various functions of the data interpolation module 804, equalizer module 806, and/or echo cancellation module 808, including a matching filter, a linear interpolation filter, or other suitable filter.

The signal provided by the echo cancellation module 808 is suitably provided to the data extraction module 812, which slices the symbol data to extract the binary value of the symbol. The data provided by the data extraction module 812 is suitably provided to the serial-to-parallel module and the framing code detection module 810. The framing code detection module 810 searches for a valid framing code to provide for byte synchronization. The byte synchronization facilitates the alignment of the incoming bit stream on a byte boundary in the output buffer 410B. For conventional teletext data, the framing code comprises an eight bit code. For NABTS data, the framing code is 1-1-1-0-0-1-1-1 (E7h). Similarly, the framing code for WST is 1-1-1-0-0-1-0-0 (E4h). Two other framing codes are reserved for future use in NABTS as well: 1-0-0-0-0-1-0-0 (84h) and 0-0-1-0-1-1-0-1 (4Dh). When the appropriate code is detected by the framing code detection module, the data extraction module 812 transfers the following data to the serial-to-parallel module. The serial-to-parallel module converts the serial data stream into 8-bit (one byte) parallel data. If the data byte is Hamming encoded, the Hamming decode module decodes the data. The data is then provided to the output buffer 410B such that the first bit of the data signal is aligned with the first bit of the buffer 410B.

It should be further noted that the framing code detection module 810 suitably operates in conjunction with a lookup table of values which indicate receipt of a framing code. For example, the framing code detection module 810 suitably collects the incoming serial bits in an 8-bit buffer. Each set of bits collected in the buffer may be looked up in the lookup table to detect whether the framing code has been received. This lookup table may be also used to correct errors in the framing code byte. In the current lookup table, an algorithm to minimize the length error between bytes is used to generate correspondence between a decoded framing code byte versus a known acceptable framing code byte.

In particular, each time a new bit is shifted into the 8-bit register, the current eight bits are suitably looked up in the lookup table to detect a valid framing code. If the lookup table indicates that the current 8-bit value matches a framing code, such as one of the four conventional teletext framing codes described above, a result is returned indicating that the framing code has been received. If not, the framing code detection module exits and waits until a new bit is shifted into the register.

In some cases, it is possible that an error may occur and change the value of one or more bits. Certain errors, however, do not cause any synchronization problems because the system may be programmed to proceed with the serial-to-parallel conversion despite the error. For example, referring now to FIG. 14, a one-bit error in any of the four teletext framing codes produces eight potential erroneous codes. Those that might be confused with another signal, such as a clock synchronization signal or the framing code of a different sort of teletext, are ignored. However, those codes having a one-bit error that do not bear similarity to other relevant codes, such as the clock synchronization signal or the framing code of a different sort of teletext, are suitably considered valid codes. If a line having an erroneous-but-acceptable code is processed, an error counter is suitably incremented to track the number of Hamming code errors. The list of codes corresponding to valid codes and erroneous-but-acceptable codes may be stored in a lookup table for efficient access. In the present embodiment, the framing code error detection function may be enabled or disabled, for example according to the desires of the user.

Before being written to the output buffer 410B, however, the data is subject to error checking by the Hamming decode module 814, if the Hamming decode module 814 is enabled. In the present embodiment, the Hamming decode module 814 may be selectively enabled or disabled, or particular functions, such as error correction, may be selectively enabled or disabled. An NABTS packet includes five Hamming encoded bytes, whereas a WST packet includes two Hamming encoded bytes. The Hamming decode module 814 suitably operates in conjunction with a lookup table to detect errors. If a one-bit error occurs, the Hamming code decoder module 814 suitably corrects the error prior to writing the data to the output buffer 410B. If a two-bit error is detected, the Hamming decode module 814 analyzes the data according to a logical algorithm to decide whether to reject or retain the data packet. For example, if one of the first three Hamming bytes in a NABTS packet have two-bit errors, the packet is rejected. Alternatively, the Hamming decode module suitably counts the number of Hamming bits in error. If the total of number of errors exceeds, for example, four errors, the packet is rejected. A Hamming decode scheme can detect two-bit errors and correct one-bit errors.

For NABTS, the first three bytes of the five Hamming encoded bytes represent a packet address value. Once they are decoded, the result is 12 bits to represent the packet address which is used to filter the service channel. Each of the 4096 service channels may be enabled or disabled by the software interface. The only information required is whether to accept or reject a specific packet based on its address value, which can be established a lookup table in the main memory 406.

Prior to operation of the receiver 106, the processing unit 408 and other relevant components of the receiver 106 are suitably initialized to prepare for operation. For example, various parameters such as a framing code table and a Hamming code table may be loaded into main memory 406. In addition, the various other internal operating parameters, such as a multiplication lookup table, the filter coefficients for the equalization module, and the echo cancellation module lookup table, may also be loaded. The receiver 106 then begins processing data to process each line of raw video data. To optimize efficiency, the decoder functions may not be called for each line of data; instead, the data may be stored in a buffer that contains, for example, 20 lines. When the buffer is full, the processing unit 408 may then initiate the decoding functions to decode all of the information in the buffer and store the decoded information in the output buffer. If some lines of data are rejected, the rejected lines may also be noted.

For example, referring now to FIG. 13, the receiver 106 initially executes an initialization routine to perform various initialization functions, such as those described above (step 1310). A data processing module is then suitably initiated to process each line of raw video data that may contain VBI information. The receiver 106 commences collecting data and storing it in a buffer, for example in the main memory 406. When the buffer is full, an input pointer is set at the beginning of the input buffer in the main memory 406 and an output pointer is set at the beginning of the output buffer, such as output buffer 410B (step 1312).

Because conventional teletext data is provided on lines 10 through 20 of the video signal and closed caption data is provided on line 21, the processing unit 408 initially determines whether the current line in the input buffer corresponds to line 21 of the video signal (step 1314). If not, the processing unit 408 calls the teletext module 800. The teletext module 800 searches for a valid clock synchronization signal (step 1316). If none is identified, the processing unit 408 proceeds to the next line in the buffer (step 1318). If the clock synchronization signal is detected, the line of data is decoded and provided to the output buffer 410B (step 1320). The processing unit 408 then determines whether the current line of data is the last line in the buffer. If so, the process terminates until the input buffer fills with data, and the processing unit 408 is released to perform other duties (step 1322). If not, the pointers are set to the next entries, and the analysis process is renewed.

If the current line of data in the buffer is line 21, the processing unit 408 calls the closed caption module 500. The closed caption module 500 searches for a valid closed caption clock synchronization signal (step 1324). If none is identified, the processing unit 408 proceeds to the next line in the input buffer (step 1326). If the clock synchronization signal is detected, the line of data is decoded and provided to the output buffer 410A (step 1328). The processing unit 408 then proceeds with determining whether the current line of data is the last line in the buffer and processing the data accordingly as described above.

It should be noted that the present decoding system may be programmed to decode any line with any type of data, including closed caption and/or teletext data. For example, if the decoder system is programmed to decode teletext data on line 21, the system attempts to decode the data as teletext before trying to decode the data as closed caption data. Similarly, if the system is programmed to decode closed caption on line 50, it attempts to decode the data as closed caption data on this line. In addition, the decoder of the present system may be adapted to support other television standards, for example PAL, SECAM, and other types of data transmission systems associated with a video signal.

In a preferred embodiment, the decoder may be programmed to collect information relating to the performance of the system, such as the quality of the incoming signal, whether lines of data are rejected, and processing time. The collected information may be processed to generate statistics, stored to be downloaded or processed later, or otherwise manipulated.

Thus, a receiver according to various aspects of the present invention provides a software-implemented system for decoding teletext and closed caption data transmitted with a video signal. The system is especially suited for time critical applications, such as in a computer environment. The system is also particularly suited to a system in which the sampling of the incoming signal is not synchronized to the incoming signal.

Because the processing unit is not required to process the incoming data continuously, processor resources may be dedicated to other tasks in the system. In addition, conventional circuitry may be used to provide the decode functions. Further, because the present system is capable of detecting whether the incoming video line contains teletext or closed caption data, the system may more quickly relinquish the processing resources to other tasks if no data is included in the current video line.

Moreover, due to the software nature of the implementation, the system is easily and inexpensively upgraded and maintained. For example, the decoder system may be easily reconfigured to adapt to a particular environment by simply adjusting portions of the code and operating parameters. These changes may be provided in any manner. In addition, upgrades to the operation of the decoder system may be downloaded to the system using the decoder system itself. Further, any sort of data may be received via the decoder system, including computer files, applications, and the like.

While the principles of the invention have now been made clear in illustrative embodiments, there will be immediately obvious to those skilled in the art many modifications of structure, arrangements, proportions, the elements, materials and components, used in the practice of the invention which are particularly adapted for a specific environment and operating requirements without departing from those principles.

What is claimed is:

1. A computer-implemented decoding system for decoding a secondary signal embedded in a primary signal, comprising:
   a memory having a plurality of samples corresponding to the primary signal,
   a clock recovery module for identifying a clock synchronization signal embedded in the primary signal, wherein said clock recovery module identifies a first sample closest to an extremum of said clock synchronization signal; and
   a data extraction module responsive to the identified clock synchronization signal for extracting the secondary signal from the primary signal based on the identified clock synchronization signal, said data extraction module generating a plurality of binary values according to values of samples taken at selected intervals after said sample closest to said extremum.

2. The decoding system of claim 1, wherein primary signal comprises a video signal and the secondary signal is embedded in the vertical blanking interval of the video signal.

3. The decoding system of claim 1, wherein said clock recovery module and said data extraction module are implemented in a processing unit of a non-dedicated computer system.

4. The decoding system of claim 1, wherein said clock recovery module and said data extraction module are implemented in a processing unit of a television receiver.

5. The decoding system of claim 1, wherein said clock recovery module identifies an extremum of said clock synchronization signal.

6. The decoding system of claim 1, wherein said clock recovery module determines a DC offset of at least one of the primary signal and the secondary signal.

7. The decoding system of claim 1 further comprising:
   a sampling unit, wherein said sampling unit samples the primary signal and the secondary signal and stores the samples in said memory, wherein said clock recovery module reads said samples from said memory.

8. The decoding system of claim 7, wherein said sampling unit comprises a video grabber.

9. The decoding system of claim 7, wherein said clock recovery module periodically suspends operation while said sampling unit stores the samples in said memory.

10. The decoding system of claim 7, wherein the secondary signal is characterized by a secondary signal frequency, and wherein said sampling unit samples said primary signal at a rate at least four times that of the secondary signal frequency.

11. The decoding system of claim 7, wherein the secondary signal is characterized by a secondary signal frequency, and wherein said sampling unit samples said primary signal at a rate at least about ten times that of the secondary signal frequency.

12. The decoding system of claim 11, wherein said clock recovery module identifies a peak of said clock synchronization signal by comparing a first sample with a second sample, and said second sample is approximately 180 degrees out of phase with said first sample according to the secondary signal frequency.

13. The decoding system of claim 1, wherein said data extraction module suspends extraction of the secondary signal if the clock recovery module fails to identify said clock synchronization signal within a selected time period.

14. The decoding system of claim 1, wherein magnitudes of said samples taken at said selected intervals are interpolated to generate said binary values.

15. The decoding system of claim 1, wherein magnitudes of said selected intervals are adjusted according to an average duration between a plurality of said samples.

16. The decoding system of claim 1, wherein:
   said clock recovery module identifies a first sample closest to an extremum of said clock synchronization signal, a second sample preceding said first sample, and a third sample subsequent to said first sample; and
   the decoding system further comprises a data interpolation module, wherein said data interpolation module generates an adjustment value corresponding to magnitude of a displacement of said first sample from said extremum of said clock synchronization signal.

17. The decoding system of claim 16, wherein said data interpolation module calculates an approximate amplitude of the secondary signal at said extremum of the secondary signal.

18. The decoding system of claim 16, wherein said data interpolation module comprises at least one of a finite impulse response filter, a zero-padding filter, and a decimation filter.

19. The decoding system of claim 16, wherein said data interpolation module generates said adjustment value according to the following equation:

$$ADJ = K^*(x_{+1} - x_{-1})/(2^*x - x_{+1} - x_{-1})$$

where ADJ is the adjustment value, K is a constant, x corresponds to the value of the first sample, $x_{-1}$ corresponds to the value of the second sample, and $x_{+1}$ corresponds to the value of the third sample.

20. The decoding system of claim 19, wherein said constant corresponds to a ratio of a rate at which said primary signal is sampled to a rate at which said secondary signal transmits data.

21. The decoding system of claim 1, wherein said clock recovery module compares an amplitude of said clock synchronization signal to a threshold and execution of said data extraction module is suspended if said clock synchronization signal amplitude is less than said threshold.

22. The decoding system of claim 1, wherein said clock recovery module compares a frequency of said clock synchronization signal to a selected range of frequencies and execution of said data extraction module is suspended if said clock synchronization signal frequency is not within said range of frequencies.

23. The decoding system of claim 1, further comprising a byte synchronization module for identifying a starting point of the secondary signal embedded in the primary signal.

24. The decoding system of claim 23, wherein said byte synchronization module compares a selected portion of the video signal to a desired byte synchronization c ode and identifies said starting point if said selected portion of the primary signal corresponds to said desired byte synchronization code.

25. The decoding system of claim 24, wherein said desired byte synchronization code corresponds to at least one of a closed caption framing code and a teletext framing code.

26. The decoding system of claim 24, wherein said byte synchronization module compares said selected portion of the video signal to at least one byte synchronization code having an error and identifies said starting point if said selected portion of the primary signal corresponds to said byte synchronization code having an error.

27. The decoding system of claim 26, wherein said desired byte synchronization code and said at least one byte synchronization code having an error are stored in a lookup table.

28. The decoding system of claim 1, further comprising an equalizer module for compensating for at least one of amplitude distortion, phase distortion, and multipath distortion of the secondary signal.

29. The decoding system of claim 28, wherein said equalizer module is adaptive.

30. The decoding system of claim 28, wherein said equalizer module includes a transversal filter.

31. The decoding system of claim 30, wherein said transversal filter has a variable number of taps, and wherein said number of taps is adjusted according to the quality of the secondary signal.

32. The decoding system of claim 30, wherein said equalizer module further includes a coefficients damping unit.

33. The decoding system of claim 28, wherein said equalizer module further includes an error clipping unit, wherein said error clipping unit limits said compensation to a maximum amount of said compensation applied to the secondary signal.

34. The decoding system of claim 28, wherein said equalizer module further includes an error clipping unit, wherein said error clipping unit compensates only if said distortion exceeds a minimum threshold.

35. The decoding system of claim 1, further comprising an echo cancellation unit for compensating for the effects of multipath distortion in the secondary signal.

36. The decoding system of claim 35, wherein said echo cancellation unit includes a lookup table.

37. The decoding system of claim 1, further comprising a Hamming decode module receiving the extracted secondary signal from said data extraction module for decoding Hamming code data embedded in the secondary signal.

38. The decoding system of claim 37, wherein said Hamming decode module determines whether the extracted secondary signal is relevant based on a Hamming encoded packet address.

39. The decoding system of claim 37, wherein said Hamming decode module includes a lookup table for detecting and correcting errors based on said Hamming decode data.

40. The decoding system of claim 1, further comprising a serial-to-parallel converter receiving the extracted secondary signal from said data extraction module for converting the extracted secondary signal from a serial format to a parallel format.

41. The decoding system of claim 1, wherein said secondary signal includes closed caption data.

42. The decoding system of claim 1, wherein said secondary signal includes teletext data.

43. A computer-implemented decoder system for extracting a data signal comprising at least one of closed caption data and teletext data from a video signal, comprising:
   a memory having a plurality of samples corresponding to the video signal;
   a clock recovery module for identifying a substantially periodic clock synchronization signal, wherein said clock recovery module identifies an extremum of said clock synchronization signal and generates a bit synchronization signal corresponding to the clock synchronization signal, and wherein said bit synchronization signal identifies a sample closest to said extremum of said clock synchronization signal; and
   a data extraction module responsive to the clock recovery module and receiving said bit synchronization signal, wherein said data extraction module generates a binary signal corresponding to the amplitude of a selected portion of the video signal, wherein said selected portion is selected according to said bit synchronization signal and said binary signal is generated according to amplitudes of samples taken at selected intervals after said sample closest to said extremum.

44. The decoding system of claim 43, wherein said clock recovery module and said data extraction module are implemented in a processing unit of a non-dedicated computer system.

45. The decoding system of claim 43, wherein said clock recovery module and said data extraction module are implemented in a processing unit of a television receiver.

46. The decoding system of claim 43, wherein said clock recovery module determines a DC offset of the clock sychronization signal.

47. The decoding system of claim 43, further comprising:
   a sampling unit, wherein said sampling unit samples the video signal and stores the samples in said memory, wherein said clock recovery module reads said samples from said memory.

48. The decoding system of claim 47, wherein said sampling unit comprises a video grabber.

49. The decoding system of claim 47, wherein the data signal is characterized by a data signal frequency, and wherein said sampling unit samples said video signal at a rate at least four times that of the data signal frequency.

50. The decoding system of claim 47, wherein the data signal is characterized by a data signal frequency, and wherein said sampling unit samples the video signal at a rate at least about ten times that of the data signal frequency.

51. The decoding system of claim 50, wherein said clock recovery module identifies a peak of said clock synchronization signal by comparing a first sample with a second sample, wherein said second sample is approximately 180 degrees out of phase with said first sample according to the data signal frequency.

52. The decoding system of claim 43, wherein said data extraction module suspends extraction of the data signal if the clock recovery module fails to identify said clock synchronization signal within a selected time period.

53. The decoding system of claim 43, wherein:
   said clock recovery module identifies a first sample closest to an extremum of said clock synchronization signal, a second sample preceding said first sample, and a third sample subsequent to said first sample; and
   the decoding system further comprises a data interpolation module, wherein said data interpolation module generates an adjustment value corresponding to magnitude of a displacement of said first sample from said extremum of said clock synchronization signal.

54. The decoding system of claim 53, wherein said data interpolation module calculates an approximate amplitude of the data signal at said extremum of the data signal.

55. The decoding system of claim 53, wherein said data interpolation module includes at least one of a finite impulse response filter, a zero-padding filter, and a decimation filter.

56. The decoding system of claim 53, wherein said data interpolation module generates said adjustment value according to the following equation:

$$ADJ = K^*(x_{+1} - x_{-1})/(2^*x - x_{+1} - x_{-1})$$

where ADJ is the adjustment value, K is a constant, x corresponds to the value of the first sample, $x_{-1}$ corresponds to the value of the second sample, and $x_{+1}$ corresponds to the value of the third sample.

57. The decoding system of claim 56, wherein said constant corresponds to a ratio of a rate at which said video signal is sampled to a rate at which said data signal transmits data.

58. The decoding system of claim 43, wherein said clock recovery module compares a peak-to-peak amplitude of said clock synchronization signal to a threshold and execution of said data extraction module is suspended if said clock synchronization signal amplitude is less than said threshold.

59. The decoding system of claim 43, wherein said clock recovery module compares a frequency of said clock synchronization signal to a selected range of frequencies and execution of said data extraction module is suspended if said clock synchronization signal frequency is not within said range of frequencies.

60. The decoding system of claim 43, further comprising a byte synchronization module for identifying a starting point of the data signal embedded in the video signal.

61. The decoding system of claim 60, wherein said byte synchronization module compares a selected portion of the video signal to a desired byte synchronization code and identifies said starting point if said selected portion of the video signal corresponds to said desired byte synchronization code.

62. The decoding system of claim 61, wherein said desired byte synchronization code corresponds to at least one of a closed caption framing code and a teletext framing code.

63. The decoding system of claim 61, wherein said byte synchronization module compares said selected portion of the video signal to at least one byte synchronization code having an error and identifies said starting point if said selected portion of the video signal corresponds to said byte synchronization code having an error.

64. The decoding system of claim 63, wherein said desired byte synchronization code and said at least one byte synchronization code having an error are stored in a lookup table.

65. The decoding system of claim 43, further comprising an equalizer module for compensating for at least one of amplitude distortion, phase distortion, and multipath distortion of the data signal.

66. The decoding system of claim 65, wherein said equalizer module is adaptive.

67. The decoding system of claim 65, wherein said equalizer module includes a transversal filter.

68. The decoding system of claim 67, wherein said transversal filter has a variable number of taps, and wherein said number of taps is adjusted according to the quality of the data signal.

69. The decoding system of claim 67, wherein said equalizer module further includes a coefficients damping unit.

70. The decoding system of claim 65, wherein said equalizer module further includes an error clipping unit, wherein said error clipping unit limits said compensation to a maximum amount of said compensation applied to the secondary signal.

71. The decoding system of claim 65, wherein said equalizer module further includes an error clipping unit, wherein said error clipping unit compensates only if said distortion exceeds a minimum threshold.

72. The decoding system of claim 43, further comprising an echo cancellation unit for compensating for the effects of multipath distortion in the data signal.

73. The decoding system of claim 72, wherein said echo cancellation unit includes a lookup table.

74. The decoding system of claim 43, further comprising a Hamming decode module receiving the extracted data signal from said data extraction module for decoding Hamming code data embedded in the data signal.

75. The decoding system of claim 74, wherein said Hamming decode module determines whether the extracted data signal is relevant according to a packet address associated with said data signal.

76. The decoding system of claim 74, wherein said Hamming decode module includes a lookup table for detecting and correcting errors based on said Hamming decode data.

77. The decoding system of claim 43, further comprising a serial-to-parallel converter receiving the extracted data signal from said data extraction module for converting the extracted data signal from a serial format to a parallel format.

78. The decoding system of claim 43, wherein said data signal includes closed caption data.

79. The decoding system of claim 43, wherein said data signal includes teletext data.

80. A decoding system for decoding a data signal including at least one of closed caption data and teletext data embedded in a video signal, comprising:
   a sampling unit, wherein said sampling unit periodically samples the video signal and generates a plurality of digital values corresponding to the amplitude of the video signal at a plurality of said samples; and
   a processing unit, wherein said processing unit:
      receives a plurality of said digital values,
      generates bit synchronization information corresponding to the phase of the video signal based on said received plurality of digital values, wherein said processing unit identifies an extremum peak of a first clock cycle and a minimum peak of a second clock cycle, said first clock cycle and said second clock cycle comprising a clock synchronization portion of said video signal, and wherein said processing unit generates said bit synchronization information based on said extremum peak and said minimum peak of said clock synchronization portion;
      selects a set of data samples according to said bit synchronization information;
      compares each of said data samples in said selected set to a threshold; and
      generates a binary value corresponding to each of said data samples in said selected set according to said comparison.

81. The decoding system of claim 80, wherein the data signal is embedded in the vertical blanking interval of the video signal.

82. The decoding system of claim 80, wherein said processing unit is a component of a CPU of a general purpose computer system.

83. The decoding system of claim 80, wherein said processing unit is a component of a television receiver.

84. The decoding system of claim 80, wherein said processing unit averages a plurality of said digital values corresponding to a clock synchronization portion of said video signal and a DC offset value based on said average of said plurality of digital values.

85. The decoding system of claim 80, further comprising a memory, wherein said sampling unit stores said digital values in said memory, wherein said processing unit reads said digital values from said memory.

86. The decoding system of claim 85, wherein said sampling unit comprises a video grabber.

87. The decoding system of claim 85, wherein said processing unit periodically suspends at least one of said generation of said bit synchronization information, said selection of said set of data values, said comparison of each of said data samples, and said generation of said binary values, while said sampling unit stores said digital values in said memory.

88. The decoding system of claim 85, wherein the data signal is characterized by a data signal frequency, and wherein said sampling unit samples said video signal at a rate at least four times that of the data signal frequency.

89. The decoding system of claim 85, wherein the data signal is characterized by a data signal frequency, and wherein said sampling unit samples said video signal at a rate at least about ten times that of the data signal frequency, and said processing unit identifies a peak of video signal by comparing a digital value of a first sample with a digital value of a second sample, wherein said second sample is approximately 180 degrees out of phase with said first sample according to the data signal frequency.

90. The decoding system of claim 80, wherein said processing unit suspends said generation of binary values if said processing unit fails to detect a clock synchronization portion of said video signal within a selected time period.

91. The decoding system of claim 80, wherein said processing unit identifies a sample closest to said extremum peak of a clock synchronization portion of said video signal, and generates said binary values corresponding to digital values of samples taken at selected intervals after said sample closest to said extremum peak.

92. The decoding system of claim 91, wherein magnitudes of said samples taken at said selected intervals are interpolated to generate said binary values.

93. The decoding system of claim 91, wherein magnitudes of said selected intervals are adjusted according to an average duration between a plurality of said extrema.

94. The decoding system of claim 80, wherein said processing unit identifies a first sample closest to said extremum peak of a clock synchronization portion of said video signal, a second sample preceding said first sample, and a third sample subsequent to said first sample, and further generates an adjustment value corresponding to a magnitude of a displacement of said first sample from said extremum peak of said clock synchronization portion.

95. The decoding system of claim 94, wherein said processing unit calculates an approximate amplitude of the data signal at said extremum of the data signal.

96. The decoding system of claim 94, wherein said processing unit functions as a finite impulse response filter for processing the digital values.

97. The decoding system of claim 94, wherein said processing unit generates said adjustment value according to the following equation:

$$ADJ = K^*(x_{+1} - x_{-1})/(2^*x - x_{+1} - x_{-1})$$

where ADJ is the adjustment value, K is a constant, x corresponds to the value of the first sample, $x_{-1}$ corresponds to the value of the second sample, and $x_{+1}$ corresponds to the value of the third sample.

98. The decoding system of claim 97, wherein said constant corresponds to a ratio of a rate at which said video signal is sampled to a rate at which said data signal transmits data.

99. The decoding system of claim 80, wherein said processing unit compares an amplitude of a clock synchronization portion of said video signal to a threshold, and suspends at least one of said generation of said bit synchronization information, said selection of said set of data values, said comparison of each of said data samples, and said generation of said binary values if said clock synchronization signal amplitude is less than said threshold.

100. The decoding system of claim 80, wherein said processing unit compares a frequency of a clock synchronization portion of said video signal to a selected range of frequencies and suspends at least one of said generation of said bit synchronization information, said selection of said set of data values, said comparison of each of said data samples and said generation of said binary values if said clock synchronization signal frequency is not within said range of frequencies.

101. The decoding system of claim 80, wherein said processing unit identifies a starting point of the data signal embedded in the video signal.

102. The decoding system of claim 101, wherein said processing unit compares a selected portion of the video signal to a desired byte synchronization code and identifies said starting point if said selected portion of the video signal corresponds to said desired byte synchronization code.

103. The decoding system of claim 102, wherein said desired byte synchronization code corresponds to at least one of a closed caption framing code and a teletext framing code.

104. The decoding system of claim 102, wherein said processing unit compares said selected portion of the video signal to at least one byte synchronization code having an error and identifies said starting point if said selected portion of the primary signal corresponds to said byte synchronization code having said error.

105. The decoding system of claim 104, wherein said desired byte synchronization code and said at least one byte synchronization code having an error are stored in a lookup table.

106. The decoding system of claim 80, wherein said processing unit compensates for at least one of amplitude distortion, phase distortion, and multipath distortion of the data signal.

107. The decoding system of claim 106, wherein compensation is adaptive.

108. The decoding system of claim 106, wherein said processing unit functions as a transversal filter.

109. The decoding system of claim 108, wherein said transversal filter has a variable number of taps, and wherein said processing unit adjusts said number of taps according to the quality of the data signal.

110. The decoding system of claim 108, wherein said processing unit further functions as a coefficients damping unit.

111. The decoding system of claim 106, wherein said processing unit further limits said compensation to a maximum amount of said compensation applied to the secondary signal.

112. The decoding system of claim 106, wherein said processing unit compensates only if said distortion exceeds a minimum threshold.

113. The decoding system of claim 80, wherein said processing unit compensates for the effects of multipath distortion in the data signal.

114. The decoding system of claim 113, wherein said processing unit compensates for the effects of multipath distortion using a lookup table.

115. The decoding system of claim 113, wherein said processing unit further decodes Hamming code data embedded in the data signal.

116. The decoding system of claim 115, wherein said Hamming code data includes a packet address, and said processing unit determines whether the data signal is relevant according to said packet address.

117. The decoding system of claim 115, wherein said processing unit decodes said Hamming code data using a lookup table to detect and correct errors based on said Hamming decode data.

118. The decoding system of claim 80, further comprising a serial-to-parallel converter receiving the binary values from said processing unit and converting the binary values from a serial format to a parallel format.

119. A computer-implemented method of decoding a data signal having a plurality of cycles embedded in a primary signal, comprising the steps of:
    identifying a clock synchronization signal in the primary signal, wherein the step of identifying the clock synchronization signal comprises the steps of:
        sampling the primary signal;
        digitizing each of said samples;
        identifying a first sample to exceed a selected threshold; and
        identifying a sample closest to an extremum of the clock synchronization signal;
    detecting a byte synchronization signal, wherein said byte synchronization signal indicates a starting point of the data signal, and wherein step of detecting a byte synchronization signal comprises the steps of:
        identifying a set of samples corresponding to the approximate centers of a plurality of byte synchronization pulses according to said clock synchronization signal;
        assigning a binary value to each of said samples corresponding to the approximate centers of the byte synchronization cycles according to the amplitude of said cycles; and
        comparing said binary values assigned to said samples to a desired byte synchronization signal; and
    extracting the data signal from the primary signal in accordance with said identified clock synchronization signal and said byte synchronization signal.

120. The method of claim 119, wherein said data signal corresponds to a program, further comprising the step of executing said program.

121. The method of claim 119, wherein said data signal corresponds to a data file, further comprising the step of storing said data file in a memory.

122. The method of claim 119, further comprising the step of suspending the method of decoding if said clock synchronization signal is not identified.

123. The method of claim 119, further comprising the step of suspending the method of decoding if said byte synchronization signal is not detected.

124. The method of claim 119, further comprising the steps of:
    periodically sampling the primary signal;
    digitizing the samples of the primary signal;
    storing the digitized samples in a memory; and
    reading the digitized samples from the memory after collecting a plurality of said samples in said memory.

125. The method of claim 119, wherein said step of extracting the data signal from the primary signal comprises the steps of:
    identifying a starting point of a set of data signal cycles according to said byte synchronization signal;
    identifying said data signal cycles according to said clock synchronization signal; and
    assigning a binary value to each of said data signal cycles according to the amplitude of said data signal cycles.

126. The method of claim 119, wherein said step of extracting the data signal comprises the steps of:
    sampling the data signal;
    identifying a plurality of samples corresponding to a set of data signal cycles;
    interpolating between at least two of said samples to calculate a value at an optimized data sampling position; and
    assigning a binary value to said at least one of said data signal cycles according to the amplitude of said data signal cycles.

127. The method of claim 119, wherein said data signal corresponds to an upgrade program for upgrading the computer-implemented method of decoding the data signal, further comprising the step of executing said program to upgrade the method.

128. A computer-implemented decoding system for decoding a secondary signal embedded in a primary signal, comprising:
    a memory having a plurality of samples corresponding to the primary signal,
    a clock recovery module for identifying a clock synchronization signal embedded in the primary signal, wherein said clock recovery module identifies a first sample closest to an extremum of said clock synchronization signal, a second sample preceding said first sample, and a third sample subsequent to said first sample;
    a data extraction module responsive to the identified clock synchronization signal for extracting the secondary signal from the primary signal based on the identified clock synchronization signal; and
    a data interpolation module, wherein said data interpolation module generates an adjustment value corresponding to magnitude of a displacement of said first sample from said extremum of said clock synchronization signal according to the following equation:

$$ADJ=K*(x_{+1}-x_{-1})/(2*x-x_{+1}-x_{-1})$$

where ADJ is the adjustment value, K is a constant, x corresponds to the value of the first sample, $x_{-1}$ corresponds to the value of the second sample, and $x_{+1}$ corresponds to the value of the third sample.

129. The decoding system of claim 128, wherein said constant corresponds to a ratio of a rate at which said primary signal is sampled to a rate at which said secondary signal transmits data.

130. A computer-implemented decoder system for extracting a data signal comprising at least one of closed caption data and teletext data from a video signal, comprising:
    a memory having a plurality of samples corresponding to the video signal;
    a clock recovery module for identifying a substantially periodic clock synchronization signal, wherein said clock recovery module generates a bit synchronization signal corresponding to the clock synchronization signal, and wherein said clock recovery module identifies a first sample closest to an extremum of said clock synchronization signal, a second sample preceding said first sample, and a third sample subsequent to said first sample;
    a data extraction module responsive to the clock recovery module and receiving said bit synchronization signal, wherein said data extraction module generates a binary signal corresponding to the amplitude of a selected portion of the video signal, wherein said selected portion is selected according to said bit synchronization signal, and a data interpolation module, wherein said data interpolation module generates an adjustment value corresponding to magnitude of a displacement of said first sample from said extremum of said clock synchronization signal according to the following equation:

$$ADJ = K^*(x_{+1} - x_{-1})/(2^*x - x_{+1} - x_{-1})$$

where ADJ is the adjustment value, K is a constant, x corresponds to the value of the first sample, x−1 corresponds to the value of the second sample, and x+1 corresponds to the value of the third sample.

131. The decoding system of claim 130, wherein said constant corresponds to a ratio of a rate at which said video signal is sampled to a rate at which said data signal transmits data.

132. A decoding system for decoding a data signal including at least one of closed caption data and teletext data embedded in a video signal, comprising:

a sampling unit, wherein said sampling unit periodically samples the video signal and generates a plurality of digital values corresponding to the amplitude of the video signal at a plurality of said samples; and a processing unit, wherein said processing unit:

receives a plurality of said digital values;

generates bit synchronization information corresponding to the phase of the video signal based on said received plurality of digital values;

selects a set of data samples according to said bit synchronization information;

compares each of said data samples in said selected set to a threshold; and generates a binary value corresponding to each of said data samples in said selected set according to said comparison and wherein said processing unit identifies a first sample closest to an extremum of a clock synchronization portion of said video signal, a second sample preceding said first sample, and a third sample subsequent to said first sample, and further generates an adjustment value corresponding to a magnitude of a displacement of said first sample from said extremum of said clock synchronization portion according to the following equation:

$$ADJ = K^*(x_{+1} - x_{-1})/(2^*x - x_{+1} - x_{-1})$$

where ADJ is the adjustment value, K is a constant, x corresponds to the value of the first sample, $x_{-1}$ corresponds to the value of the second sample, and $x_{+1}$ corresponds to the value of the third sample.

133. The decoding system of claim 132, wherein said constant corresponds to a ratio of a rate at which said video signal is sampled to a rate at which said data signal transmits data.

* * * * *